(12) United States Patent
Katz et al.

(10) Patent No.: US 9,003,795 B2
(45) Date of Patent: Apr. 14, 2015

(54) METHOD AND APPARATUS FOR OPERATING A SOLAR STEAM SYSTEM

(75) Inventors: Sami Katz, Kiryat Bialik (IL); Israel Kroizer, Jerusalem (IL)

(73) Assignee: Brightsource Industries (Israel) Ltd., Jerusalem (IL)

( * ) Notice: Subject to any disclaimer, the term of this patent is extended or adjusted under 35 U.S.C. 154(b) by 31 days.

(21) Appl. No.: 13/511,158

(22) PCT Filed: Nov. 23, 2010

(86) PCT No.: PCT/IB2010/055368
§ 371 (c)(1),
(2), (4) Date: May 22, 2012

(87) PCT Pub. No.: WO2011/064718
PCT Pub. Date: Jun. 3, 2011

(65) Prior Publication Data
US 2012/0227401 A1   Sep. 13, 2012

Related U.S. Application Data

(60) Provisional application No. 61/264,055, filed on Nov. 24, 2009.

(51) Int. Cl.
*B60K 16/00* (2006.01)
*F24J 2/07* (2006.01)
*F24J 2/16* (2006.01)

(52) U.S. Cl.
CPC .. *F24J 2/07* (2013.01); *Y02E 10/41* (2013.01); *F24J 2/16* (2013.01); *Y02E 10/46* (2013.01)

(58) Field of Classification Search
CPC ......... F03G 6/003; F03G 6/065; F22B 1/006; F24J 2/07; F24J 2/16; Y02E 10/41; Y02E 10/46

USPC .............. 60/641.1–641.15, 641.8, 664, 645; 126/600, 617, 601, 605, 610
See application file for complete search history.

(56) References Cited

U.S. PATENT DOCUMENTS

| | | |
|---|---|---|
| 811,274 A | 1/1906 | Carter |
| 2,999,943 A | 9/1961 | Willard |

(Continued)

FOREIGN PATENT DOCUMENTS

| | | |
|---|---|---|
| DE | 10248068 | 5/2004 |
| EP | 0106688 | 3/1985 |

(Continued)

OTHER PUBLICATIONS

BCB Informatica y Control. Heliostat Calibration for Concentrating Solar Power Plants Using Machine Vision [online]. [retrieved on Nov. 17, 2009]. Retrieved from the Internet: <URL: http://bcb.es/documentos/descargar.php?id=29>.

(Continued)

*Primary Examiner* — Thomas Denion
*Assistant Examiner* — Kelsey Stanek
(74) *Attorney, Agent, or Firm* — Miles & Stockbridge P.C.; Mark A. Catan

(57) ABSTRACT

The disclosed subject matter relates to methods and systems for operating a solar steam system in response to a detected or predicted reduced insolation condition (for example, sunset or a cloud condition). In some embodiments, for a period of time, enthalpy stored within a solid material of a conduit via which steam travels en route to a steam turbine is used to heat the steam to drive the turbine. In some embodiments, a net migration of heliostats away from the steam superheater is carried out in response to the detected or predicted reduced insolation condition.

20 Claims, 27 Drawing Sheets

(56) References Cited

U.S. PATENT DOCUMENTS

| | | |
|---|---|---|
| 3,892,433 A | 7/1975 | Blake |
| 3,924,604 A | 12/1975 | Anderson |
| 4,034,735 A | 7/1977 | Waldrip |
| 4,044,753 A | 8/1977 | Fletcher et al. |
| 4,102,326 A | 7/1978 | Sommer |
| 4,117,682 A | 10/1978 | Smith |
| 4,146,785 A | 3/1979 | Neale |
| 4,172,443 A | 10/1979 | Sommer |
| 4,219,729 A | 8/1980 | Smith |
| 4,227,513 A | 10/1980 | Blake et al. |
| 4,245,618 A | 1/1981 | Wiener |
| 4,247,182 A | 1/1981 | Smith |
| 4,265,223 A | 5/1981 | Miserlis et al. |
| 4,283,887 A | 8/1981 | Horton et al. |
| 4,289,114 A | 9/1981 | Zadiraka |
| 4,297,521 A | 10/1981 | Johnson |
| 4,331,829 A | 5/1982 | Palazzetti et al. |
| 4,343,182 A | 8/1982 | Pompei |
| 4,365,618 A | 12/1982 | Jones |
| 4,438,630 A | 3/1984 | Rowe |
| 4,459,972 A | 7/1984 | Moore |
| 4,474,169 A | 10/1984 | Steutermann |
| 4,485,803 A | 12/1984 | Wiener |
| 4,490,981 A | 1/1985 | Meckler |
| 4,512,336 A | 4/1985 | Wiener |
| 4,564,275 A | 1/1986 | Stone |
| 4,633,854 A | 1/1987 | Mayrhofer |
| 4,913,129 A | 4/1990 | Kelly et al. |
| 5,128,799 A | 7/1992 | Byker |
| 5,417,052 A | 5/1995 | Bharathan et al. |
| 5,578,140 A | 11/1996 | Yogev et al. |
| 5,759,251 A | 6/1998 | Nakamura et al. |
| 5,861,947 A | 1/1999 | Neumann |
| 5,862,799 A | 1/1999 | Yogev et al. |
| 5,867,989 A * | 2/1999 | Platell .............................. 60/659 |
| 5,899,199 A | 5/1999 | Mills |
| 5,905,590 A | 5/1999 | Van Der Sluis et al. |
| 5,982,481 A | 11/1999 | Stone et al. |
| 6,080,927 A | 6/2000 | Johnson |
| 6,131,565 A | 10/2000 | Mills |
| 6,310,725 B1 | 10/2001 | Duine et al. |
| 6,597,709 B1 | 7/2003 | Diver, Jr. |
| 6,653,551 B2 | 11/2003 | Chen |
| 6,662,801 B2 | 12/2003 | Hayden et al. |
| 6,818,818 B2 | 11/2004 | Bareis |
| 6,899,097 B1 | 5/2005 | Mecham |
| 6,926,440 B2 | 8/2005 | Litwin |
| 6,957,536 B2 | 10/2005 | Litwin et al. |
| 6,959,993 B2 | 11/2005 | Gross et al. |
| 7,042,615 B2 | 5/2006 | Richardson |
| 7,191,597 B2 | 3/2007 | Goldman |
| 7,191,736 B2 | 3/2007 | Goldman |
| 7,207,327 B2 | 4/2007 | Litwin et al. |
| 7,296,410 B2 | 11/2007 | Litwin |
| 7,331,178 B2 | 2/2008 | Goldman |
| 7,340,899 B1 | 3/2008 | Rubak et al. |
| 7,523,921 B2 | 4/2009 | Garrity |
| 7,884,279 B2 | 2/2011 | Dold et al. |
| 8,001,960 B2 | 8/2011 | Gilon et al. |
| 8,033,110 B2 | 10/2011 | Gilon et al. |
| 2004/0086021 A1 | 5/2004 | Litwin |
| 2004/0231716 A1 | 11/2004 | Litwin |
| 2005/0126170 A1 | 6/2005 | Litwin |
| 2007/0084208 A1 | 4/2007 | Goldman |
| 2007/0157614 A1 | 7/2007 | Goldman |
| 2007/0157922 A1 | 7/2007 | Radhakrishnan et al. |
| 2007/0221208 A1 | 9/2007 | Goldman |
| 2007/0272234 A1 | 11/2007 | Allen et al. |
| 2008/0000436 A1 | 1/2008 | Goldman |
| 2008/0011288 A1 | 1/2008 | Olsson |
| 2008/0011290 A1 | 1/2008 | Goldman et al. |
| 2008/0293132 A1 | 11/2008 | Goldman et al. |
| 2008/0295883 A1 | 12/2008 | Ducellier et al. |
| 2008/0314438 A1 | 12/2008 | Tran et al. |
| 2009/0038608 A1 | 2/2009 | Caldwell |
| 2009/0056701 A1 | 3/2009 | Mills et al. |
| 2009/0107485 A1 | 4/2009 | Reznik et al. |
| 2009/0121495 A1 * | 5/2009 | Mills .............................. 290/4 D |
| 2009/0151769 A1 | 6/2009 | Corbin et al. |
| 2009/0178668 A1 | 7/2009 | Boggavarapu |
| 2009/0217921 A1* | 9/2009 | Gilon et al. .................. 126/600 |
| 2009/0229264 A1 | 9/2009 | Gilon et al. |
| 2009/0250052 A1 | 10/2009 | Gilon et al. |
| 2010/0006087 A1 | 1/2010 | Gilon et al. |
| 2010/0139644 A1 | 6/2010 | Schwarzbach et al. |
| 2010/0191378 A1 | 7/2010 | Gilon et al. |
| 2010/0236239 A1 | 9/2010 | Kroizer et al. |
| 2010/0263709 A1 | 10/2010 | Norman et al. |
| 2010/0282242 A1 | 11/2010 | Gilon et al. |
| 2010/0300510 A1 | 12/2010 | Goldman et al. |
| 2011/0036343 A1 | 2/2011 | Kroyzer et al. |
| 2011/0088396 A1* | 4/2011 | Katz et al. .................... 60/641.8 |
| 2011/0220091 A1 | 9/2011 | Kroyzer |
| 2012/0024282 A1 | 2/2012 | Gilon et al. |

FOREIGN PATENT DOCUMENTS

| | | |
|---|---|---|
| IL | WO2008154599 | * 12/2008 |
| JP | 56-102646 | 8/1981 |
| WO | WO 2004/004016 | 1/2004 |
| WO | WO 2004/067933 | 8/2004 |
| WO | WO 2007/118223 | 10/2007 |
| WO | WO 2008/092194 | 8/2008 |
| WO | WO 2008/092195 | 8/2008 |
| WO | WO 2008/114248 | 9/2008 |
| WO | WO 2008/118980 | 10/2008 |
| WO | WO 2008/128237 | 10/2008 |
| WO | WO 2008/154599 | 12/2008 |
| WO | WO 2008154599 A1 * | 12/2008 |
| WO | WO 2009/015219 | 1/2009 |
| WO | WO 2009/015388 | 1/2009 |
| WO | WO 2009/021099 | 2/2009 |
| WO | WO 2009/055624 | 4/2009 |
| WO | WO 2009/070774 | 6/2009 |
| WO | WO 2009/103077 | 8/2009 |
| WO | WO 2009/131787 | 10/2009 |
| WO | WO 2011/064718 | 6/2011 |
| WO | WO 2011/140021 | 11/2011 |
| WO | WO 2012/014153 | 2/2012 |

OTHER PUBLICATIONS

"Central Receiver Systems" in: Stine, W.B., and Geyer, M., Power from the Sun [online], 2001 [retrieved on Nov. 17, 2011]. Retrieved from the Internet: <URL: http://www.powerfromthesun.net/Chapter10/Chapter10new.htm>, Chapter 10.

Cohen et al., "Final Report on the Operation and Maintenance Improvement Project for Concentrating Solar Power Plants," SAND99-1290 [online], Jun. 1999 [retrieved on May 16, 2012]. Retrieved from the Internet: <URL: http://infohouse.p2ric.org/ref/17/16933/1693301.pdf>.

Lopez-Martinez et al., "Vision-based system for the safe operation of a solar power tower plant," Iberamia, 2002, LNAI 2527: pp. 943-952.

"Mean and Peak Wind Load Reduction on Heliostats," Colorado State University, Solar Energy Research Institute, U.S. Department of Energy [online], Sep. 1987 [retrieved on May 16, 2012]. Retrieved from the Internet: <URL: http://www.nrel.gov/docs/legosti/old/3212.pdf>.

Meduri et al., "Performance Characterization and Operation of Esolar's Sierra Suntower Power Tower Plant," SolarPACES 2010 Conference, Sep. 21-24, 2010, Perpignan, France.

Mills et al., "Multi-Tower Solar Array Project," *Proceedings of the Solar Harvest Conference, 40th Annual ANZSES Conference*, 2002.

Peterka et al., "Wind Load Reduction for Heliostats," Solar Energy Research Institute, U.S. Department of Energy [online], May 1986 [retrieved on May 16, 2012]. Retrieved from the Internet: <URL: http://www.nrel.gov/docs/legosti/old/2859.pdf>.

Phipps, Gary S., "Heliostat Beam Characterization System Calibration Technique," U.S. Department of Commerce, National Technical Information Service, Sandia Labs, SAND791532C, 1979.

(56) References Cited

OTHER PUBLICATIONS

Pottler et al., "Photogrammetry: A Powerful Tool for Geometric Analysis of Solar Concentrators and Their Components," Journal of Solar Energy Engineering, Feb. 2005, 127(1): pp. 94-101.

Rabl, A., "Tower Reflector for Solar Power Plan," *Solar Energy*, 1976, 18: pp. 269-271.

Roschke, E.J., "Wind Loading on Solar Concentrators: Some General Considerations," Jet Propulsion Laboratory, National Aeronautics and Space Administration, U.S. Department of Energy [online], May 1984 [retrieved May 16, 2012]. Retrieved from the Internet: <URL: http://ntrs.nasa.gov/archive/nasa/casi.ntrs.nasa.gov/19840024844_1984024844.pdf>.

Shortis et al., "Photogrammetric Analysis of Solar Concentrators," Proceedings of the 12th Australian Remote Sensing and Photogrammetry Conference, Fremantle, Australia, 2004, pp. 1-10.

Slack et al., "Esolar Power Tower Performance Modeling and Experimental Validation," SolarPACES 2010 Conference, Sep. 21-24, 2010, Perpignan, France.

Stone, K.W., and Jones, S.A., "Analysis of Solar Two Heliostat Tracking Error Sources," Sandia National Laboratories, Report No. SAND99-0239C, Jan. 28, 1999.

Strachan, J.W. and Houser, R.M., "Testing and Evaluation of Large-Area Heliostats for Solar Thermal Applications," Solar Thermal Test Department, Sandia National Laboratories, SAND92-1381, Feb. 1993.

Vant-Hull, L.L., and Pitman, C.L., "Static and Dynamic Response of a Heliostat Field to Flux Density Limitations on a Central Receiver," *Solar Engineering*, 1990, pp. 31-38.

Office Action issued Dec. 1, 2014, in Chinese Patent Application No. 201080053130.1.

\* cited by examiner

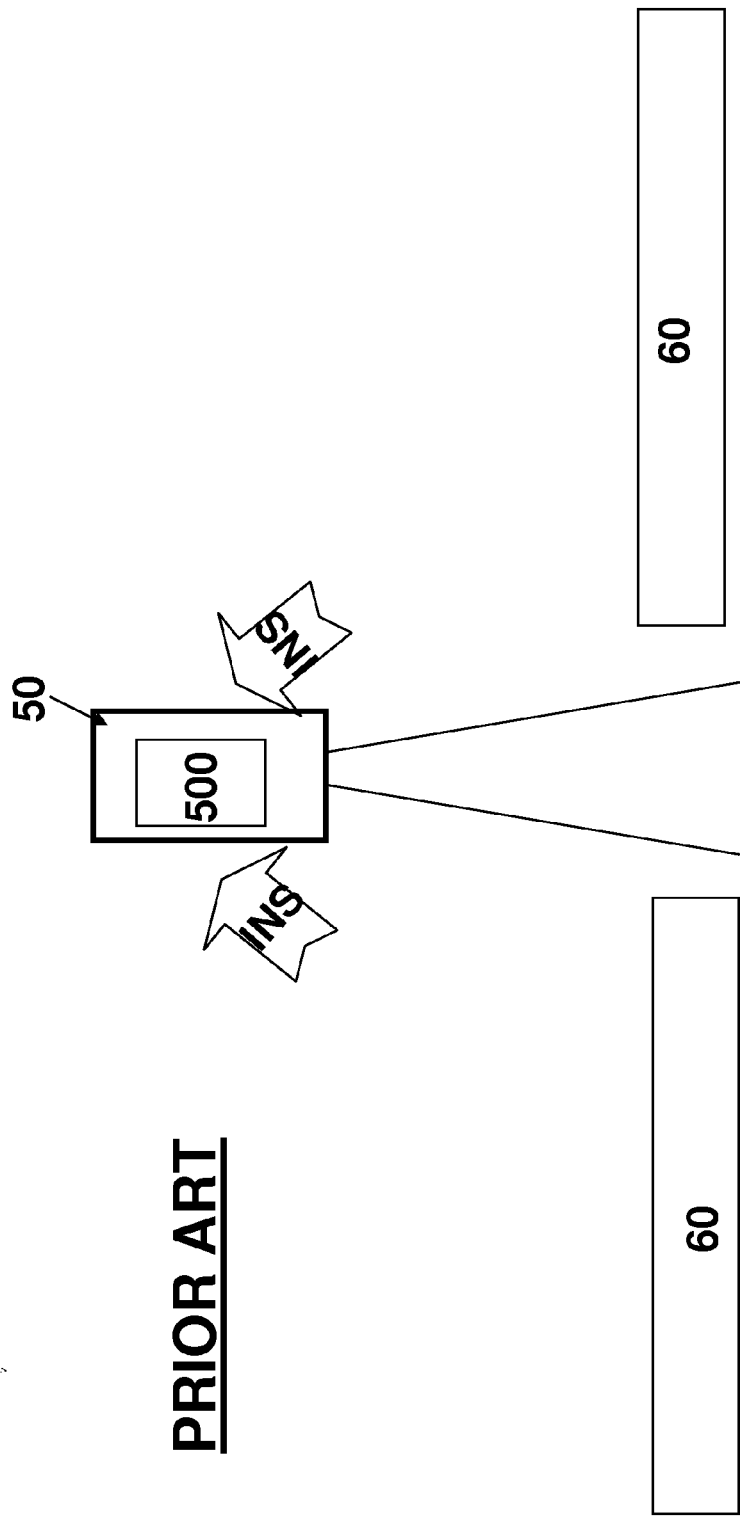
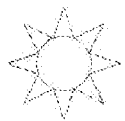
FIG. 1A
PRIOR ART

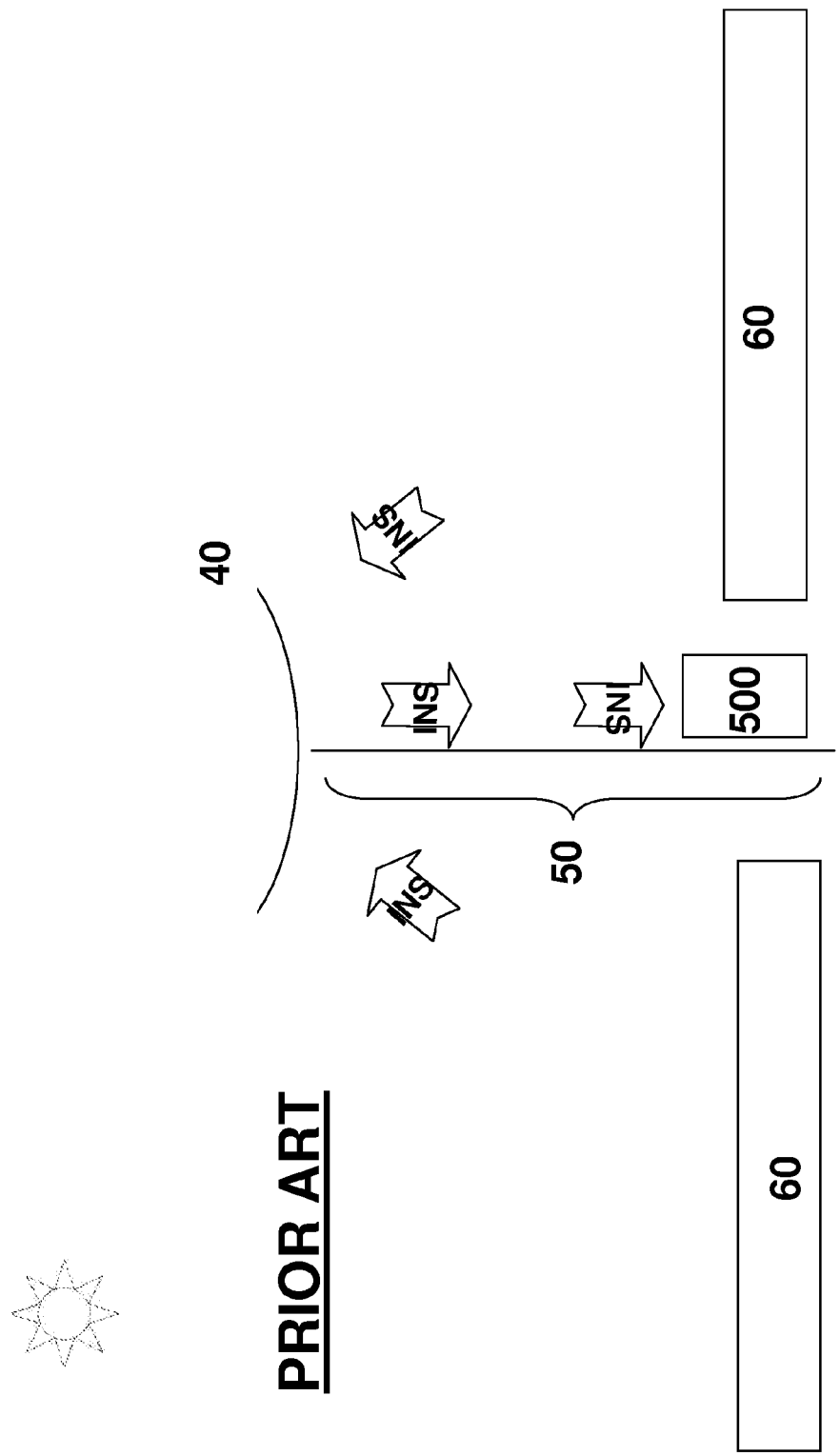

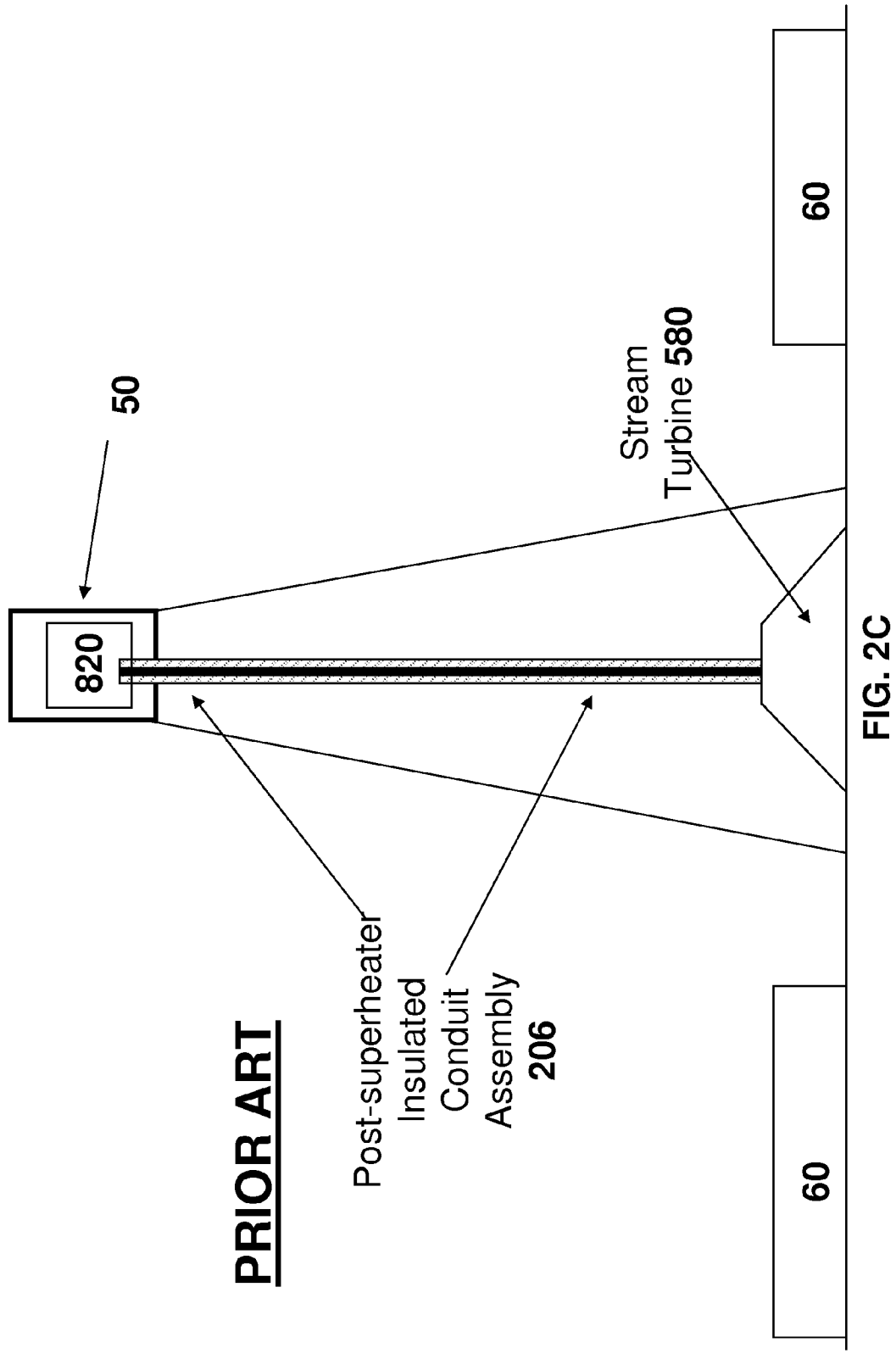

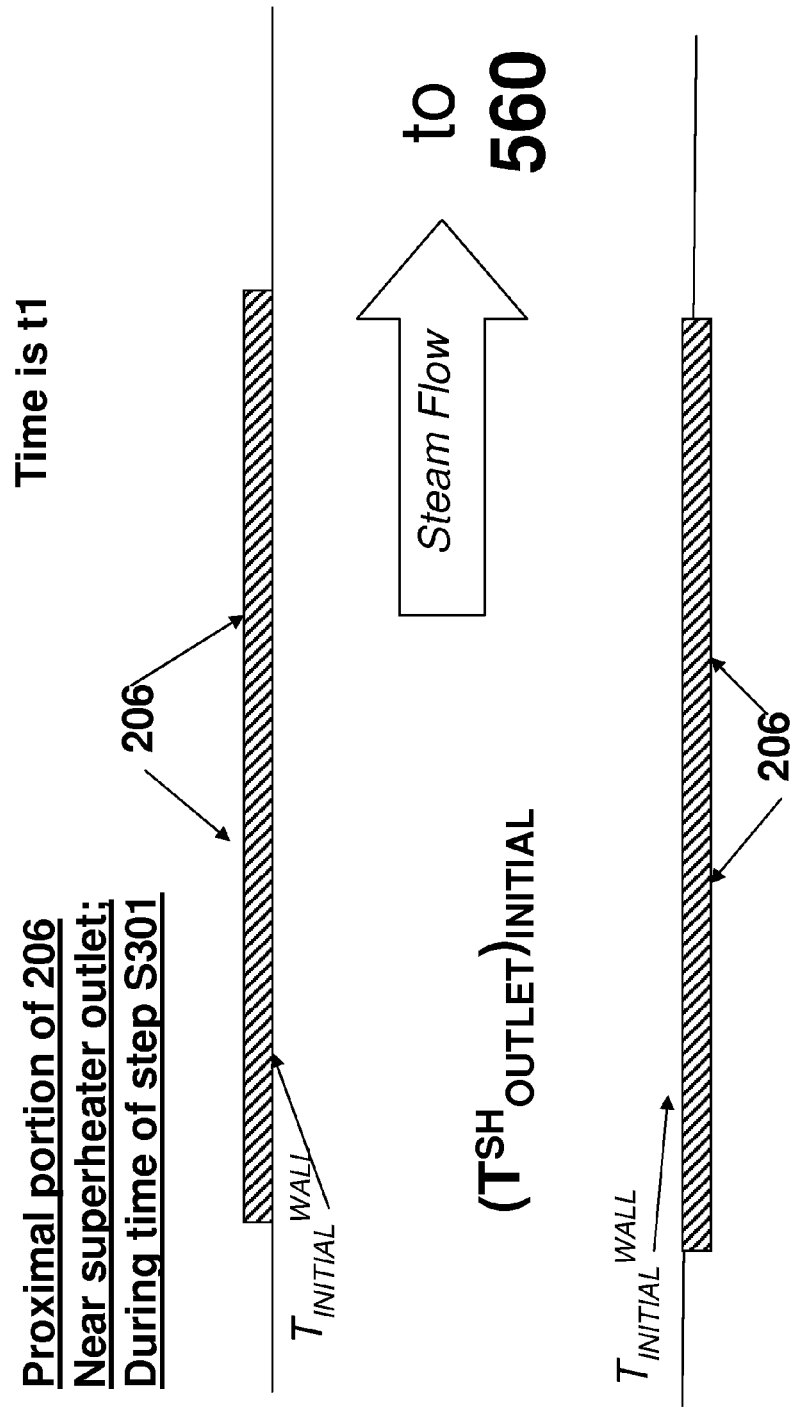

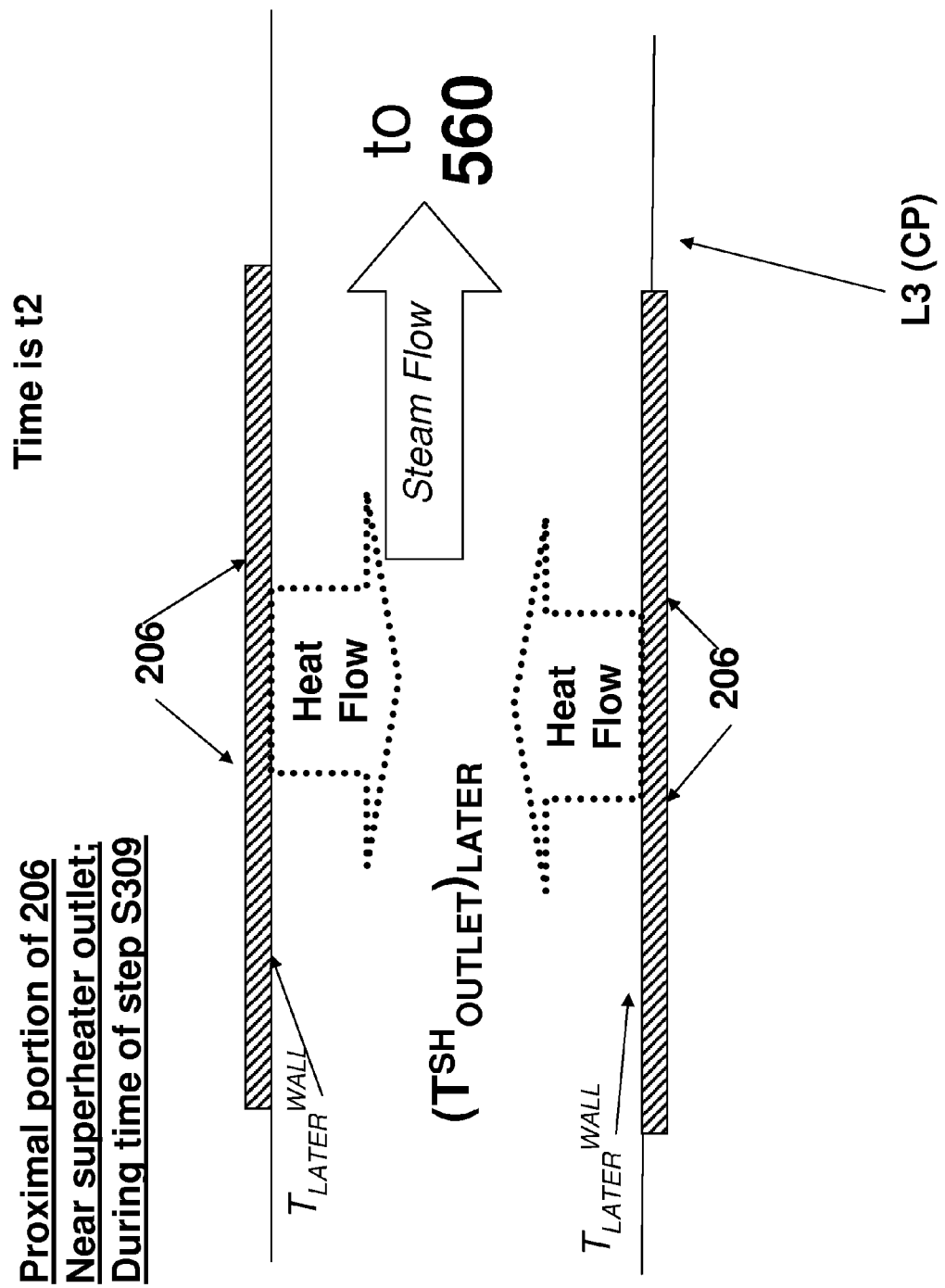

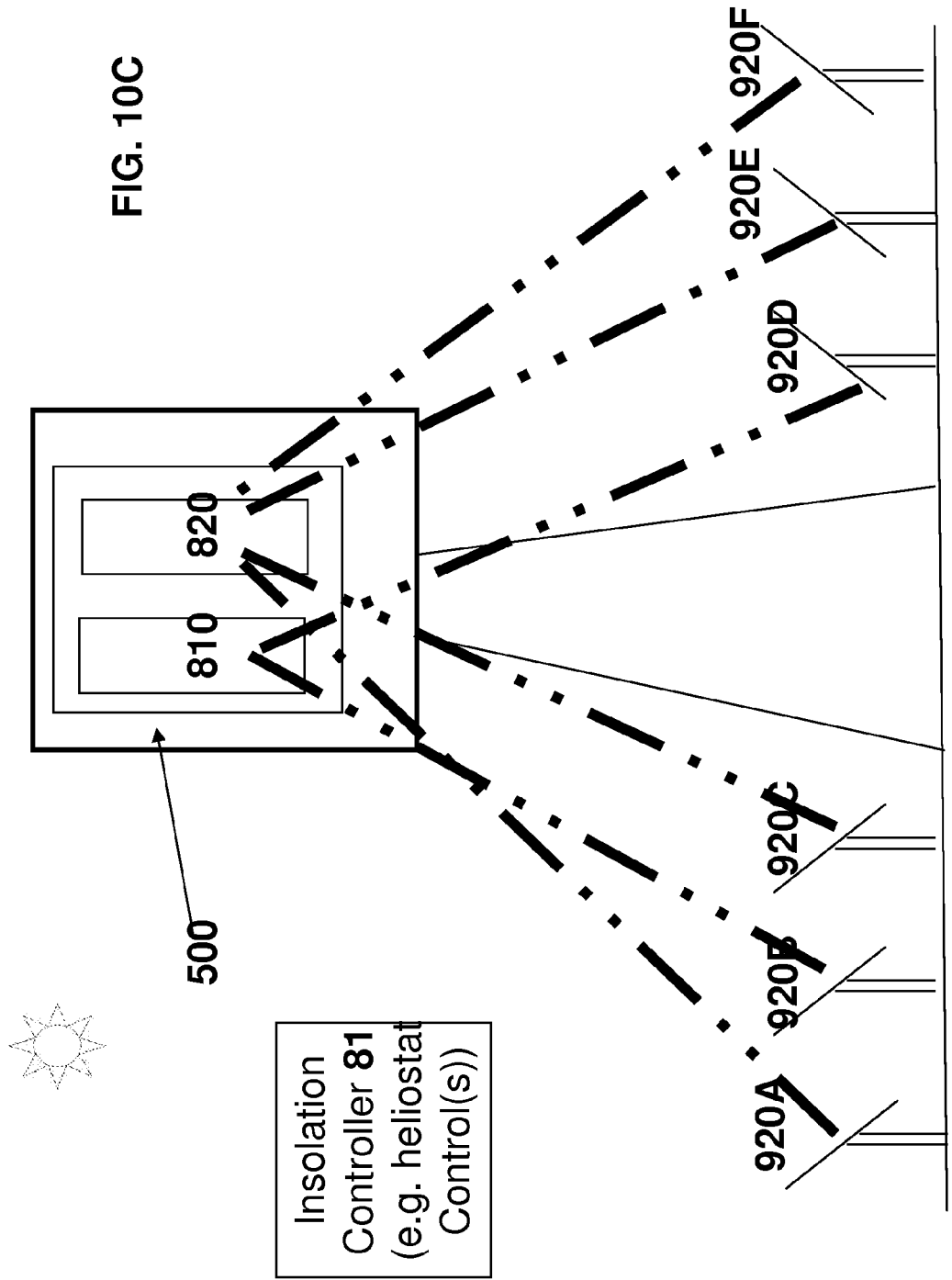

METHOD AND APPARATUS FOR OPERATING A SOLAR STEAM SYSTEM

CROSS-REFERENCE TO RELATED APPLICATIONS

The present application is a U.S. national stage of International Application No. PCT/IB10/55368, filed Nov. 23, 2010, which claims the benefit of U.S. Provisional Patent Application No. 61/264,055, filed Nov. 24, 2009, both of which are incorporated herein by reference in their entireties.

FIELD

The present application relates generally to solar energy systems, and, more particularly, to methods and systems for operating a solar steam system in response to a detected or predicted reduced insolation condition (for example, sunset or a cloud condition).

BACKGROUND AND RELATED ART

FIG. 1A-1C are illustrations of solar tower systems for generating solar steam. The system includes a solar tower 50 which receives reflected focused sunlight from a plurality 60 of heliostats. Mounted on the solar tower 50 is a solar steam system 500 including one or more solar receivers. Each solar receiver is configured to heat water and/or steam and/or supercritical steam using insolation received from the heliostats. In different examples, solar tower 50 may be at least 25 meters, at least 50 meters, at least 75 meters, or even higher.

In the example of FIG. 1A, the solar steam system solar steam system 500 is mounted at or near the top of tower 50. In the example of FIG. 1B, secondary reflector 40 is mounted at or near the top of tower 50. In the example of FIG. 1B, secondary reflector 40 receiver insolation from the heliostats 60 and reflects the insolation downward to solar steam system 500 including the receivers.

In the example of FIG. 1C, there are multiple (i.e. two or more than two) solar towers 50, each tower being associated with a respective solar steam system 500. At any given time, a given heliostat may be directed to a solar receiver of any one of the towers. Throughout the figures, "INS" is an abbreviation for 'insolation.'

FIG. 2A is a block diagram of a solar steam system including (i) a solar steam superheater 820; (ii) steam turbine 580 and (iii) upstream and downstream conduit assemblies 202 and 206 (for example, pipe assemblies comprising one or more pipes). The direction of flow (in this schematic diagram, from left to right) is indicated by a block arrow.

Pressurized steam (e.g. saturated pressurized steam or supercritical steam) (i) first enters solar superheater 820 from 'upstream' conduit assembly 202, (ii) subsequently traverses steam solar superheater 820 where the pressurized steam is subjected to insolation and superheated from temperature $T_{INLET}$ to temperature $T_{OUTLET}$ (also referred to $T^{SH}_{INLET}$ and $T^{SH}_{OUTLET}$ as where 'SH' is an abbreviation for the solar superheater); and (iii) subsequently flows from the outlet of the solar superheater to steam turbine 580 via downstream conduit assembly 206.

One salient feature of the system of FIG. 2A is that (i) steam is heated within steam superheater 820 from temperature $T^{SH}_{INLET}$ to temperature $T^{SH}_{OUTLET}$ (e.g. typically, $T^{SH}_{OUTLET} - T^{SH}_{INLET}$ is a 'significant' or 'substantial' temperature difference—for example, at least 50 degrees Celsius or at least 100 degrees Celsius) which is not insulated on at least one major surface; and (ii) steam flows within conduit assemblies 202, 206 preferably at a substantially constant temperature, for example, due to the insulation (for example, insulation around a pipe such as a metal pipe).

Within steam turbine 580, the pressurized superheated steam drives turbine 580 to generate useful work. In the present document, 'ST' is used as an abbreviation for steam turbine. 'SH' is used as an abbreviation for 'super heater.'

Typically, steam turbine 580 is operatively linked to a dynamo (not shown) in order to generate electricity—for example, as part of a solar thermal power plant. In order for steam turbine 580 to operate, steam must be supplied at a minimum temperature, referred to herein as $T^{ST}_{MINIMUM}$ or $T^{ST}_{MIN}$. In the event that the 'colder' steam whose temperature is below minimum temperature $T^{ST}_{MIN}$ enters turbine 580, turbine 580 is liable to undergo an 'uncontrolled shutdown' which may be damaging for turbine 580 and/or which may result in a situation where turbine 580 may be subsequently started up again only after paying some sort of 'thermodynamic price' and an associated longer startup time.

For this reason, flow parameters of the solar thermal system and/or insolation parameters (for example, describing a flux density or distribution on solar steam superheater SH 820) are regulated so that pressurized steam within solar superheater SH 820 is sufficiently heated to that a temperature of outlet steam $T^{SH}_{OUTLET}$ exceeds the minimum turbine operating temperature $T^{ST}_{MIN}$.

As noted above, typically the difference $(T^{SH}_{OUTLET} - T^{SH}_{INLET})$ is a 'significant' or 'substantial' temperature difference—therefore, the insolation control system and/or flow parameters are arranged so a flux density on solar superheater SH 820 is sufficiently strong and so that pressurized steam is resident within solar superheater SH 820 for sufficient time so that while within superheater 820, the pressurized steam 'crosses the minimum operating temperature threshold of turbine 580.' When steam 'crosses the minimum temperature of turbine 580,' it is heated from a temperature below $T^{TURB}_{MIN}$.

This is illustrated in FIG. 2B which illustrates a temperature profile of the pressurized steam on its journey to steam turbine 580 via conduit assemblies 202, 206 and solar steam superheater 820. As illustrated in FIG. 2B, the temperature of the pressurized steam increases (often dramatically) within steam superheater 820, while within the conduit assemblies 202, 206 there is little or no change of temperature. Thus, in FIG. 2B even if a certain small amount of heat is lost to the environment within conduit assembly 206, pressurized steam is heated with steam superheater SH 820 to such an extent that both $T^{SH}_{OUTLET}$ (i.e. the temperature at the outlet of steam superheater SH 820) and $T^{ST}_{INLET}$ (i.e. the temperature at the inlet of steam turbine 580) exceed $T^{TURB}_{MIN}$.

FIG. 2C illustrates one example where steam superheater SH 820 is located at or near the top of solar tower 50 and where steam turbine 580 is located at or near ground level. In this example, downstream conduit assembly 206 is and/or includes an elongated insulated pipe.

Insolation is variable both predictably (diurnal variation) and unpredictably, due to cloud cover, dust, solar eclipses, or other reasons. FIG. 3 illustrates an example of the intensity of beam normal insolation as a function of hour of the day, over the course of a clear-sky day. As is illustrated within the dotted rectangle, around the time of sunset, the intensity of insolation drops steeply and rapidly.

SUMMARY OF EMBODIMENTS

Embodiments of the disclosed subject matter relate to techniques and apparatus for operating a solar steam system in response to, or in anticipation of, a drop in available insolation. In one example, this drop in available insolation is due to an 'end of the day' situation where the sun is setting and/or is about to set. In another example, this drop in available insolation is due to 'persistent' cloud cover that lasts (or is predicted to last) some minimum amount of time (e.g. at least 30 minute or at least 1 hour or at least 2 hours) rather than brief passing cloud cover.

In some embodiments, during a first period of time (e.g. during 'normal' daylight hours when sunlight is relatively plentiful), some available insolation is re-directed to the solar steam superheater and other available insolation is directed to a 'non-superheater' target other than the solar steam superheater (e.g. a solar evaporator or supercritical steam generator which feeds pressurized steam to the solar steam superheater).

During a second (i.e. later) period of time (e.g. before or around sunset, or when cloud cover blocks sunlight), in response to the predicted or detected decrease in insolation, the relative fraction of insolation directed to a steam superheater that 'feeds' a steam turbine is decreased in order to divert insolation to the non-superheater target.

In one example, a system for insolation re-direction includes a plurality of heliostats that can be independently aimed to various targets (or locations therein). In this example, in response to the predicted or detected decrease in insolation, one or more heliostats that previously were directed to the solar superheater are re-directed away from the solar superheater to the non-superheater target (e.g. a solar evaporator or supercritical steam generator).

This re-directing of heliostats away from the solar superheater results in a 'net migration' of heliostats from the solar superheater to the non-superheater target.

Because this re-directing of insolation away from the steam superheater occurs at or around a time when the amount of ambient insolation is decreasing, the re-directing of insolation occurs when the temperature of steam an outlet of the solar superheater is dropping. For example, the reduction or insolation and/or re-directing of insolation away from the steam superheater may cause a situation where an outlet temperature of the steam superheater that previously was above the minimum temperature required to operate the turbine drops below this minimum temperature.

In some embodiments, the fluid path between the superheater outlet and the steam turbine is provided by a conduit assembly comprising one or more insulated conduit(s). The insulation of these conduit(s) substantially prevents heat transfer between steam flowing within the conduit assembly and the outside environment.

During the 'first' period of time when sunlight is relatively plentiful, when steam enters the conduit assembly en route to the steam turbine from the steam superheater, this steam has been sufficiently superheated within the solar superheater so that a temperature of the steam, upon entry into the conduit assembly, is above the minimum temperature required to operate the steam turbine.

According to certain embodiments, during the second (i.e. later) period of time (for example, at, before or around sunset or during a relatively cloudy period of time), enthalpy that was previously stored (e.g. during the first period of time) within solid material (e.g. metal) of the insulated conduit(s) is transferred from the solid material of the conduit(s) to steam traveling within the conduit(s) en route from the steam superheater to the steam turbine. Thus, during this second period of time, steam which enters the conduit assembly from the steam superheater at a temperature below the 'steam turbine minimum operating temperature' is heated, within the conduit assembly en route from the steam superheater to the steam turbine, by enthalpy stored within the solid material of the insulated conduit. In some embodiments, during this second period of time, enough enthalpy is stored within the conduit assembly to superheat the conduit-assembly-traversing steam en route to the steam turbine so that this stored-enthalpy-superheated steam crosses, within the conduit assembly, the steam turbine minimum operating temperature threshold' of the steam turbine.

Thus it is possible to operate the steam turbine and to generate electricity even during the second period of time when steam enters the conduit assembly from the solar steam superheater at a temperature below the minimum temperature required to operate the turbine.

In this manner, it is possible to extract useful work (e.g. during the 'second period of time'), within the steam turbine, from enthalpy which had accumulated within the solid material (e.g. metal) comprising the conduit(s) earlier in the day (for example, during a morning startup of the solar steam system or later in the day).

A solar steam system comprises: a) a steam turbine associated with a minimum operating temperature $T^{ST}_{MIN}$ defining a minimum operating temperature threshold THRESH $(T^{ST}_{MIN})$; b) a solar steam superheater for superheating pressurized steam therein by insolation; c) a downstream conduit assembly configured to provide fluid communication between an outlet of the solar steam generator and the solar steam turbine; d) control apparatus for regulating flow and/or insolation properties of the solar steam system to effect a regulation routine during a first period of time correlated with a relatively high insolation level and during a second period of time correlated with a diminishing level of insolation, so that pressurized steam driving the steam turbine enters the steam turbine by way of the steam superheater and the downstream conduit assembly such that: i) during the first period of time, the pressurized steam is superheated within the solar superheater by insolation and crosses the minimum operating temperature threshold THRESH($T^{ST}_{MIN}$) therein; ii) during the second period of time, the pressurized steam exits the solar superheater into the downstream conduit at a temperature below the minimum operating temperature $T^{ST}_{MIN}$ and is superheated within the downstream conduit by enthalpy stored therein to cross the minimum operating temperature threshold THRESH($T^{ST}_{MIN}$) within the downstream conduit.

In some embodiments, the control apparatus is configured to carry out the regulation routine so that for at least one location within the downstream conduit assembly, a temperature of an inner wall of an insulated conduit of the conduit assembly drops by at least 10 degrees Celsius (or at least 20 degrees or at least 30 degrees or at least 50 degrees Celsius) and/or drops below the minimum operating temperature threshold THRESH($T^{ST}_{MIN}$) during the second period of time.

In some embodiments, the control apparatus is further configured, after the second period of time, to obstruct a flow of steam into the steam turbine to effect an orderly shut down of the steam turbine.

In some embodiments, the control apparatus is configured to respectively generate first and second control signals corresponding to the first and second periods of time and to respectively regulate the flow and/or insolation properties of the solar steam system during the first and second periods of time in response to the generated control signals.

In some embodiments, the control signals respectively correspond to the first period time when there is predicted high sustained insolation and a second period of time when there is a predicted drop in insolation.

In some embodiments, the control apparatus is further configured, during a third period of time that occurs before the first period of time and is associated with a rising insolation level, to regulate flow and/or insolation properties of the solar steam system so that solid material of an insulated conduit of the conduit assembly is heated by solar steam traversing the conduit assembly so that the solid material crosses the minimum operating temperature threshold THRESH($T^{ST}_{MIN}$) to store enthalpy within the solid material.

In some embodiments, a duration of the second period of time is at least 1 minute or at least 2 minutes or at least 3 minutes or at least 5 minutes.

In some embodiments, a ratio between: i) a flow rate of steam entering the steam turbine from the downstream conduit assembly during the second period of time; and ii) a flow rate of steam entering the steam turbine from the downstream conduit assembly during the first period of time is at least 0.025 or at least 0.05 or at least 0.075 or at least 0.1 or at least 0.15 or at least 0.2 or at least 0.3 or at least 0.5.

A solar steam system comprises: a) an array of solar receivers including an upstream solar receiver and a downstream solar receiver in fluid communication with the upstream solar receiver, the upstream solar receiver configured to subject pressurized water flowing therein to an insolation-driven phase change to obtain pressurized steam, the downstream solar receiver configured to superheat, by insolation, the pressurized steam received from the upstream solar receiver; b) a steam turbine configured to be driven by steam received from the downstream receiver; c) a plurality of heliostats configured to re-direct insolation to the upstream and downstream solar receivers; d) a control apparatus for regulating flow and/or insolation properties of the solar steam system to respond to a diminishing insolation event by re-aiming the heliostats to effect a net migration of heliostats from the downstream solar receiver to the upstream solar receiver and to reduce an extent of superheating within the downstream solar receiver while the steam turbine continues to be driven by steam received from the downstream solar receiver.

In some embodiments, the system further comprising a conduit assembly comprising one or more insulated conduit(s) for conveying steam from the downstream receiver to the steam turbine, each conduit including solid material, where the steam received by the steam turbine from the downstream solar receiver subsequent to the re-aiming of heliostats in response to a diminishing insolation event is further heated by enthalpy contained in solid material of the conduit.

In some embodiments, the control apparatus is configured so that the extent of superheating within the downstream solar receiver is reduced to induce an at least 20 degrees Celsius temperature drop of an inner wall of the conduit between the time of the re-aiming of the heliostats and the time of cessation of steam flow from the downstream receiver to the steam turbine.

In some embodiments, the temperature drop is at least 50 degrees Celsius.

In some embodiments, the control apparatus is configured to, after the re-aiming of heliostats to effect the net migration, subsequently block a flow of steam into the steam turbine to effect an orderly shutdown of the steam turbine.

In some embodiments, the control apparatus is configured to effect the steam flow blocking so that a time between: i) the re-aiming of the heliostats to effect the net migration; and ii) the cessation of steam flow from the downstream receiver to the steam turbine to effect the orderly shutdown is at least 2 minutes or at least 5 minutes or at least 10 minutes.

In some embodiments, the system is configured so that, for a majority of a period of time after the heliostat migration and before the orderly shutdown of the steam turbine, the steam turbine operates at more than 10% or more than 20% or more than 40% or more than 50% of nominal rated capacity.

A method of driving a steam turbine by solar steam, the method comprises: a) during a first period of time correlated with a relatively high insolation level, sending pressurized solar steam into a steam turbine via a solar receiver and a conduit assembly so that while traversing the solar receiver the steam is superheated therein by insolation and crosses a minimum temperature threshold of the steam turbine; and b) during a second period of time correlated with a diminishing level of insolation, sending steam into the steam turbine via the solar receiver and the conduit assembly so that: i) steam exits the solar receiver at a temperature below the steam turbine minimum operating temperature threshold to enter the conduit assembly; and ii) steam received from the solar receiver traverses the conduit assembly and is superheated therein by stored enthalpy of solid material of an insulated conduit(s) of the conduit assembly; and iii) the stored-enthalpy-heated steam crosses the minimum temperature threshold of the steam turbine within the conduit assembly.

A method of driving a steam turbine by solar steam comprises: a) within an upstream solar receiver, subjecting pressurized water to a insolation-driven phase change to obtain pressurized steam; b) sending the pressurized steam to a downstream solar receiver; c) within the downstream solar receiver, heating the pressurized steam by insolation to superheat the steam; d) sending the superheated steam to the steam turbine to drive the steam turbine; e) for a set of heliostats, aiming a first subset of the heliostats to the upstream solar receiver and a second subset of the heliostats to the downstream solar receiver; and f) in response to a predicted or detected diminishing insolation event, re-aiming one or more heliostats to effect a net migration of heliostats from the downstream solar receiver to the upstream solar receiver and to reduce an extent of superheating within the downstream solar receiver while the steam turbine continues to be driven by steam received from the downstream solar receiver A method of driving a steam turbine by solar steam comprises: a) during a first period of time, sending hotter solar steam into a conduit assembly so that the hotter steam traverses the conduit assembly to transfer a quantity of enthalpy to solid material within one or more insulated conduits of the conduit assembly en route to the steam turbine where the solar steam drives the steam turbine to generate useful work; b) during a second period of time, sending cooler solar steam that is cooler than the hotter solar steam into the conduit assembly so that: i) at least some of the stored enthalpy that is stored within the solid material of the conduit(s) is transferred to the cooler solar steam to heat the cooler solar steam en route to the steam turbine; and ii) the solar steam which has been heated by the stored enthalpy of the solid material subsequently enters the steam turbine to generate useful work.

In some embodiments, at least 2% or at least 5% or at least 10% or at least 20% or at least 30% or at least 40% or at least 50% of the generated useful work during the second period of time is generated from the stored enthalpy.

In some embodiments, the second period of time lasts at least 2 or at least 5 or at least 10 or at least 15 or at least 20 minutes.

A solar steam system comprises: a) a steam turbine; b) a solar steam superheater for superheating pressurized steam therein by insolation; c) a downstream conduit assembly configured to provide fluid communication between an outlet of the solar steam generator and the solar steam turbine; d) control apparatus for regulating flow and/or insolation properties of the solar steam system to effect a regulation routine according to any method for driving a steam turbine by solar steam.

A method for controlling a solar thermal plant, comprises a) generating a first signal correlated with a predicted continuous high insolation level; b) in response to the first signal, controlling heliostats to apply a flux distribution on at least one receiver to generate superheated steam exiting the at least one receiver at a turbine operating temperature and to supply the superheated steam at the turbine operating temperature to a turbine; c) generating a second signal correlated with a predicted drop in insolation level; d) in response to the second signal, controlling the heliostats to apply a flux distribution on the at least one receiver to generate superheated steam exiting the at least one receiver at a reduced temperature substantially below the turbine operating temperature and to supply the superheated steam at the reduced temperature to sensible thermal energy store to further raise its temperature to a turbine operating temperature and then to a turbine; and e) generating a third signal correlated with an exhaustion of the sensible thermal energy store to reduce a flow of steam to the turbine.

A solar steam system comprises: a first solar receiver; a plurality of heliostats arranged to reflect insolation onto the first solar receiver so as to heat a fluid therein; and a controller that controls the plurality of heliostats, the controller being configured to re-aim at least one of the plurality of heliostats away from the first solar receiver in response to a temperature of fluid at an outlet of the first solar receiver being less than a threshold temperature required for a steam turbine.

In some embodiments, the system further comprises a thermal mass thermally coupled to fluid flowing from the outlet of the first solar receiver to an inlet of the steam turbine, wherein the thermal mass is arranged so as to heat fluid from the first solar receiver to a temperature above the threshold temperature when the temperature of the fluid at the outlet of the first solar receiver is less than the threshold temperature.

In some embodiments, the thermal mass is constructed and arranged so as to store heat from fluid flowing from the first solar receiver to the steam turbine when the temperature of fluid at the outlet is above the threshold temperature and to use the stored heat to heat fluid flowing from the first solar receiver to the steam turbine when the temperature of fluid at the outlet is below the threshold temperature.

In some embodiments, the thermal mass includes at least a portion of a fluid conduit between the first solar receiver and the steam turbine.

In some embodiments, the system further comprises a second solar receiver arranged upstream of the first solar receiver, wherein the controller is configured to re-aim said at least one of the plurality of heliostats at the second solar receiver.

A method for providing solar heated steam to a steam turbine comprises: in response to a reduced insolation condition, reconfiguring a distribution of solar energy from a plurality of heliostats incident on a superheating receiver, an exit temperature of steam from the superheating receiver being less than an operating threshold temperature of the steam turbine; and passing the steam exiting the superheating receiver into thermal contact with a thermal mass and then to the steam turbine such that the thermal mass heats the exiting steam to a temperature above the operating threshold temperature prior to entering the steam turbine.

In some embodiments, the method further comprises: prior to the reconfiguring, passing the steam exiting the superheating receiver into thermal contact with the thermal mass, the exiting steam having a temperature above said operating threshold temperature such that the thermal mass is heated to a temperature above the operating threshold temperature.

In some embodiments, the thermal mass includes at least a portion of a fluid conduit between the superheating receiver and the steam turbine.

In some embodiments, the reconfiguring includes reducing solar energy incident on the superheating receiver in favor of increasing solar energy incident on another receiver supplying the superheating receiver with steam In some embodiments, the reconfiguring includes re-aiming at least one heliostat from the superheating receiver to another receiver.

BRIEF DESCRIPTION OF THE DRAWINGS

The accompanying drawings, which are incorporated herein and constitute part of this specification, illustrate exemplary embodiments of the disclosed subject matter, and, together with the general description given above and the detailed description given below, serve to explain the features of the disclosed subject matter. Throughout the figures, like reference numerals denote like elements.

FIGS. 1A-1C illustrate centralized tower solar steam systems including a plurality of heliostats according to prior art.

FIGS. 2A-2C illustrate operation of a solar receiver as a solar steam superheater according to the prior art.

FIGS. 6A-6B illustrate solar steam within a conduit, according to one or more embodiments of the disclosed subject matter.

FIGS. 10A-10E illustrate aiming insolation at a plurality of solar receivers, according to one or more embodiments of the disclosed subject matter.

DETAILED DESCRIPTION OF EMBODIMENTS

The claims below will be better understood by referring to the present detailed description of example embodiments with reference to the figures. The description, embodiments and figures are not to be taken as limiting the scope of the claims. It should be understood that not every feature of the presently disclosed methods and apparatuses is necessary in every implementation. It should also be understood that throughout this disclosure, where a process or method is shown or described, the steps of the method may be performed in any order or simultaneously, unless it is clear from the context that one step depends on another being performed first. As used throughout this application, the word "may" is used in a permissive sense (i.e., meaning "having the potential to'), rather than the mandatory sense (i.e. meaning "must").

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable sub-combination.

Figure 4:
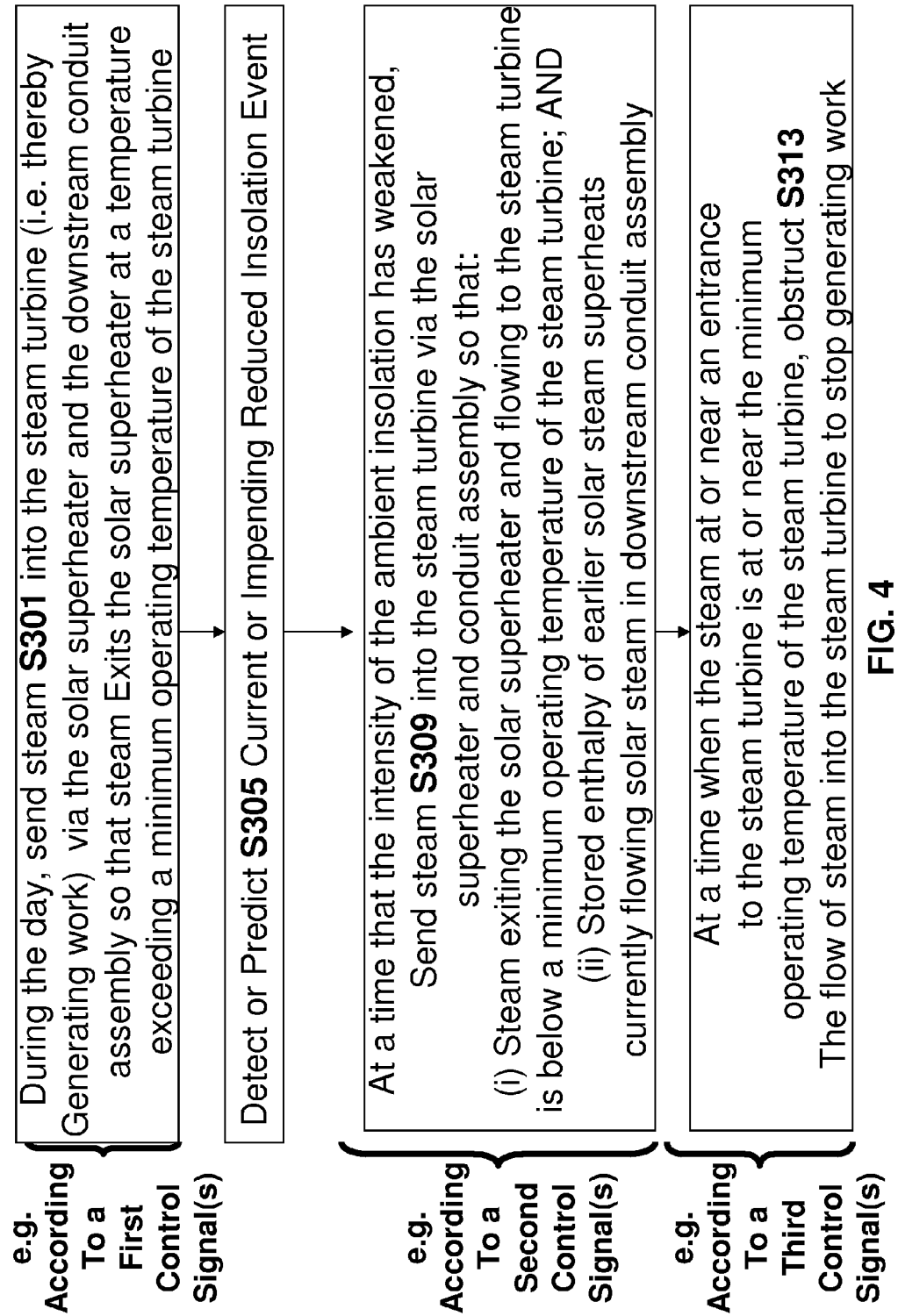
FIGS. 4, 8, 11A-11B, and 12A-12B are flow charts of routines for operating a solar steam system, according to one or more embodiments of the disclosed subject matter.

Some embodiments of the present invention relate to methods and apparatus for operating a solar thermal system which is operated in a 'first mode' and a 'second mode.' FIG. 4 is a flow chart of a routine for operating a solar steam system in according to some embodiments.

Figure 1C:
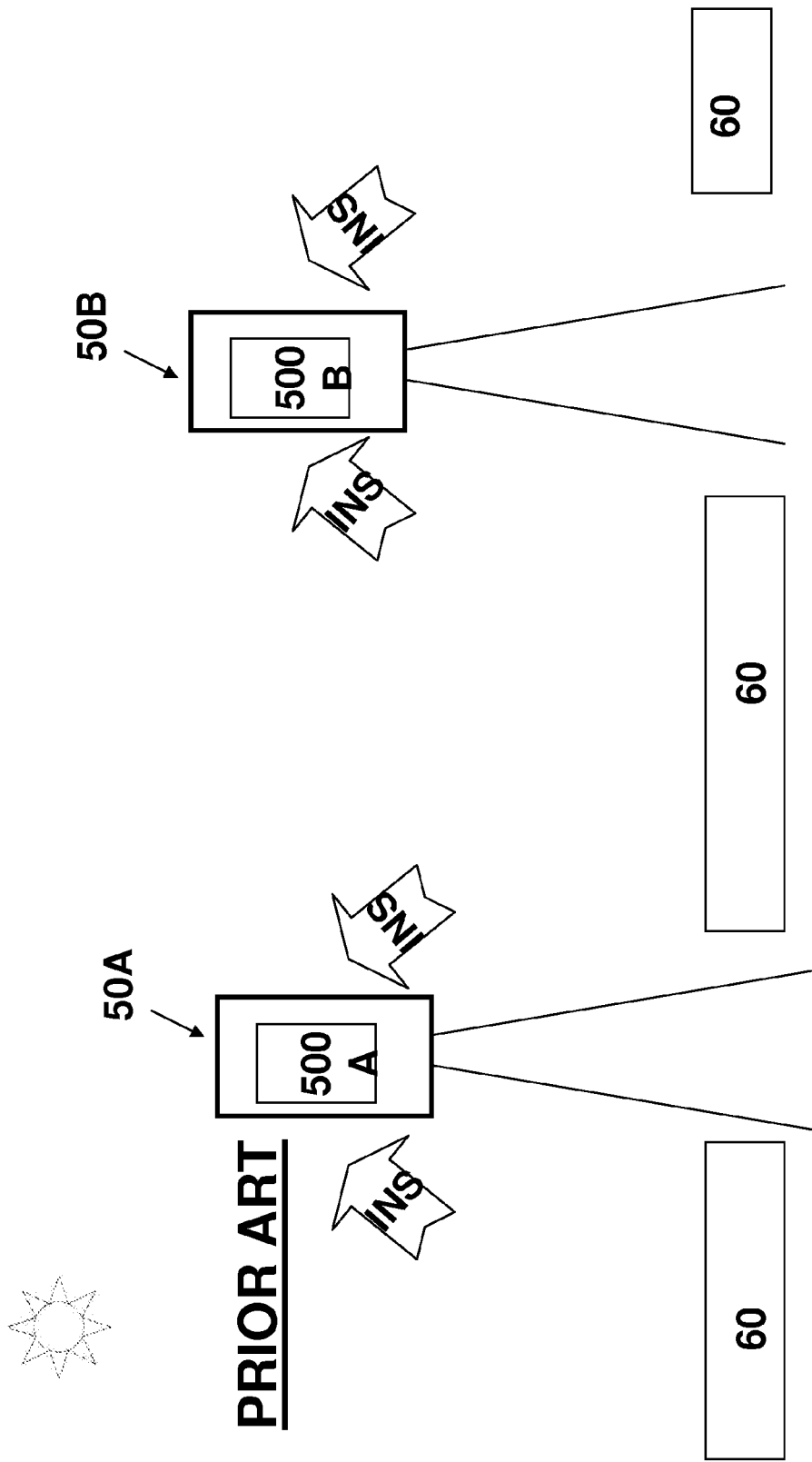
Figure 2A:
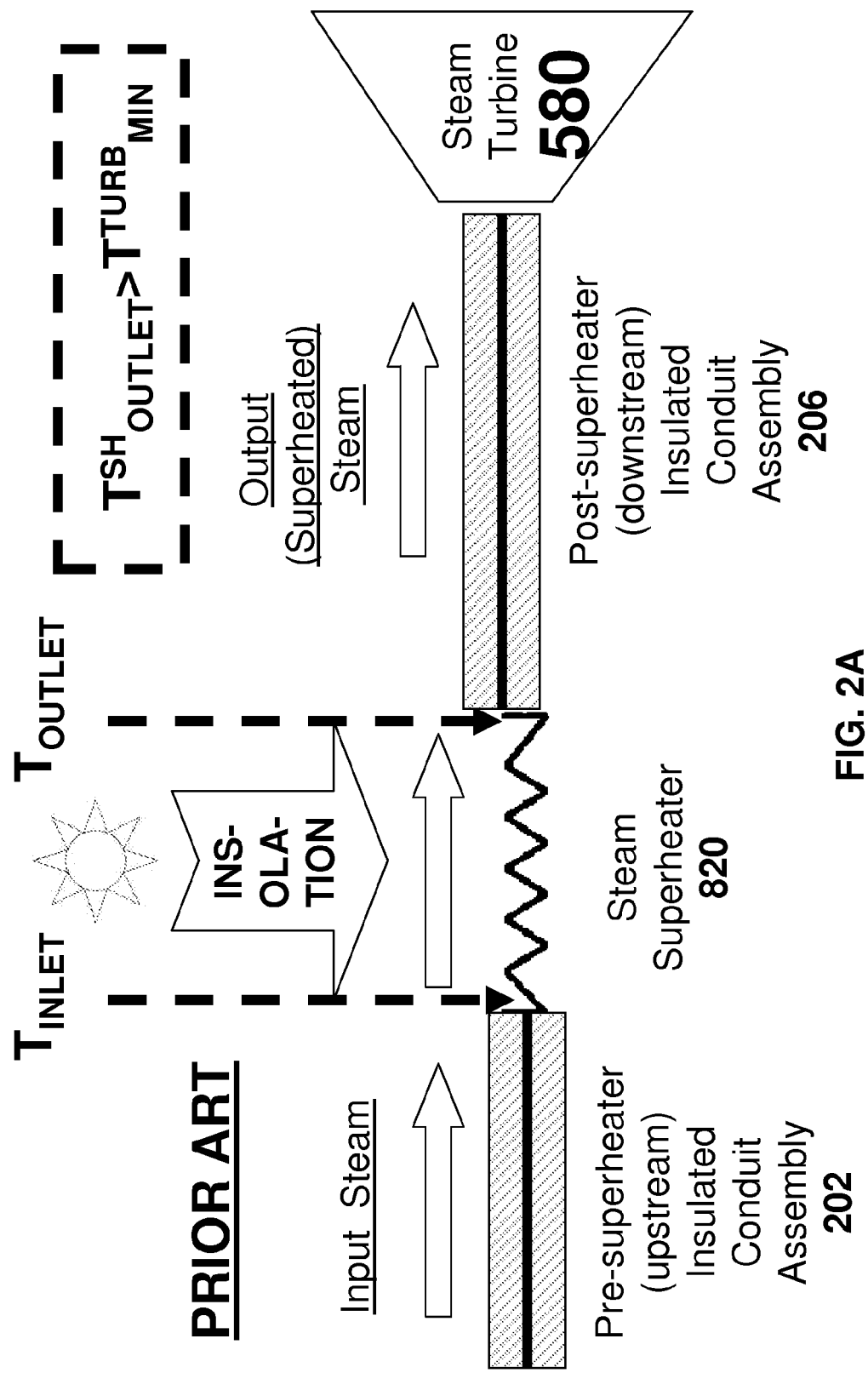
Figure 2B:
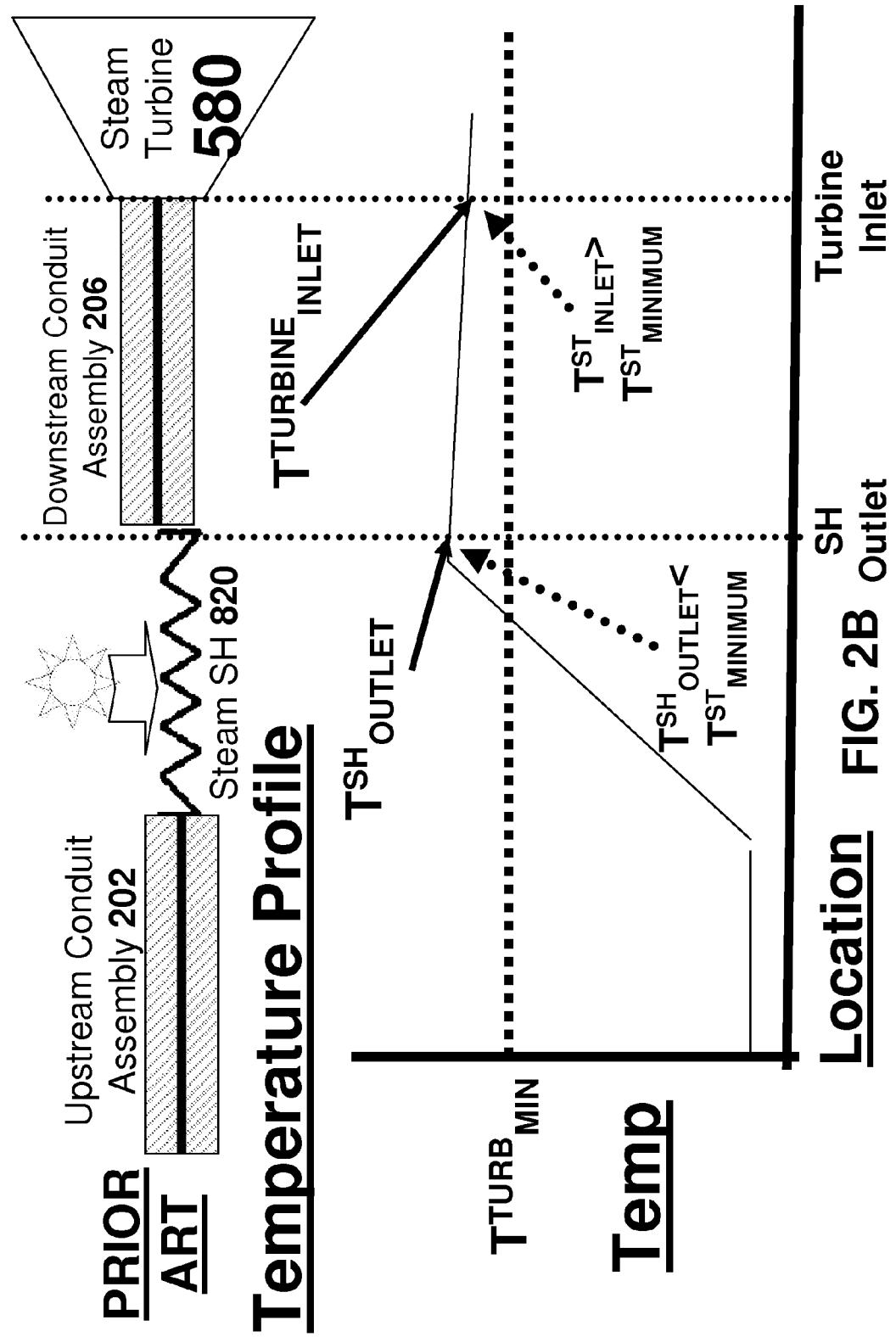
Figure 3:
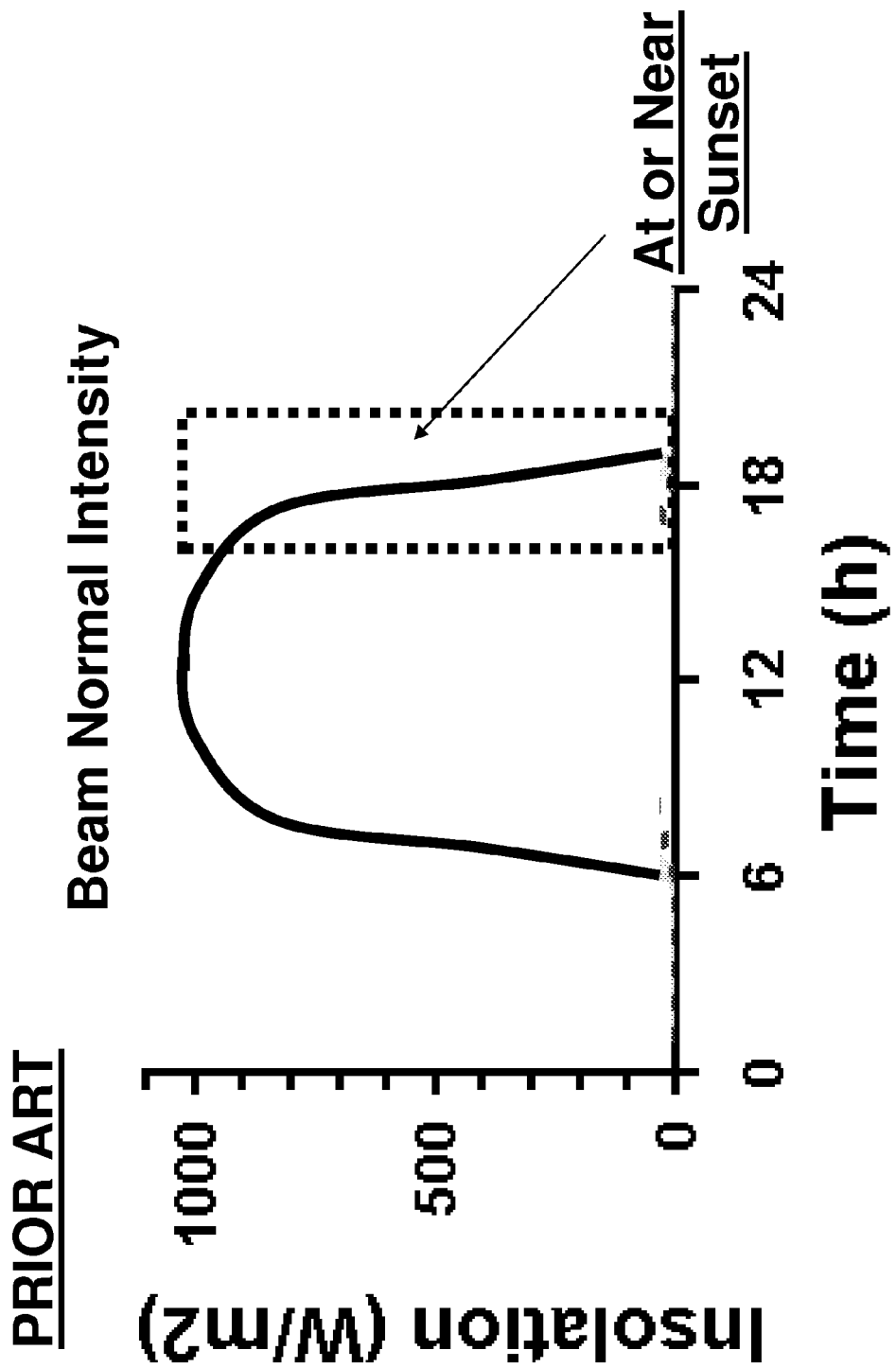
FIG. 3 illustrates the beam normal intensity as a function of time (prior art).

In step S301 (e.g. during 'normal daylight hours' when there is a plenty of sunshine), the system operates as described in FIGS. 2A-2B. Pressurized steam (e.g. generated by subjecting pressured water to insolation) such as saturated steam or supercritical steam is sent into a solar superheater 820 where it is superheated above a minimum turbine operating temperature within the solar superheater 820. The superheated steam then traverses a conduit assembly 206 where due to insulation around the conduit(s), the temperature remains substantially constant. This superheated steam is used to drive a steam turbine 580 and to obtain useful work—for example, to generate electricity.

At a later time when an intensity of ambient insolation has weakened (e.g. immediately before or during sunset; alternatively or additionally, when partially or mostly or completely cloudy conditions prevail), there is insufficient insolation directed to the solar superheater 820 to heat the pressurized steam above the minimum turbine operating temperature while the pressurized steam is located within the solar superheater 820. This 'reduced insolation event' can be detected or predicted in step S305 for example, by observing cloud cover or by correlating with the 'time of the day' to determine a time difference between a current time and sunset.

Instead of obstructing the flow of steam into steam turbine 580 (i.e. to effect an orderly shut-down of steam turbine 580) immediately upon detecting or predicting that steam exiting the superheater 820 is 'too cold' for use in the steam turbine 580 (i.e. to prevent a disordered shutdown of turbine 580), it is possible, in step S309, to adopt a different course of action. As will be discussed below with reference to step S313, it is possible to adopt this course of action without inducing a disorderly shut down of turbine 580.

Thus, in step S309, the solar steam system is operated so that steam exiting the superheater 820 into conduit assembly 206 continues to flow into turbine 580 to generate work even at a time that steam exiting the superheater 580 is below the minimum operating temperature required for turbine 580.

According to the conditions of step S309, when the steam begins its journey to steam turbine 580 via the assembly 206 of insulated conduit(s), the steam temperature (i.e. at the outlet of steam superheater 820) is thus below the minimum turbine operating temperature required. However, enthalpy stored within the insulated conduit(s) (e.g. pipes) that was supplied to the materials of the conduit(s) at an earlier time of the day (i.e. at a time of step S301—for example, when walls of conduit(s) of assembly 206 were in thermal equilibrium with hotter steam whose temperature exceeded the minimum turbine operating temperature of turbine 580) is transferred (i.e. at the time of step S309) to the pressurized steam travelling via conduit assembly 206 to steam turbine 580. This 'stored enthalpy' serves as enough of a heat reservoir to heat the steam flowing through the conduit assembly 206 for at least some period of time (e.g. for at least a minute or at least a few minutes or at least 10 minutes or at least 15 minutes) during which, turbine 580 can continue to operate and generate useful work that can be converted into electricity.

Only a limited amount of enthalpy may be stored within the conduit(s) (e.g. pipe(s)) of conduit assembly 206. For this reason, the amount of time that it is possible to operate in the 'mode' of step S309 is typically limited—in non-limited example, to at most 1 hour or at most 30 minutes or at most 20 minutes or at most 10 minutes or at most 7 minutes.

Thus, in step S313, at a later time, it is desirable to obstruct the flow of steam into steam turbine 580 to protect turbine 580 from a 'disorderly shutdown.' In one non-limiting example, this 'later time' may occur when both (i) steam exiting superheater 820 to enter conduit assembly 206 and (ii) steam at the 'distal end' of conduit assembly 206 at the inlet of steam turbine 580 is below the 'minimum operating temperature.' This is not a limitation. In another example, this may occur when the temperature at the 'distal end' of conduit assembly 206 at the inlet of steam turbine 580 is equal to or only slightly above the 'minimum operating temperature.'

Figure 5:
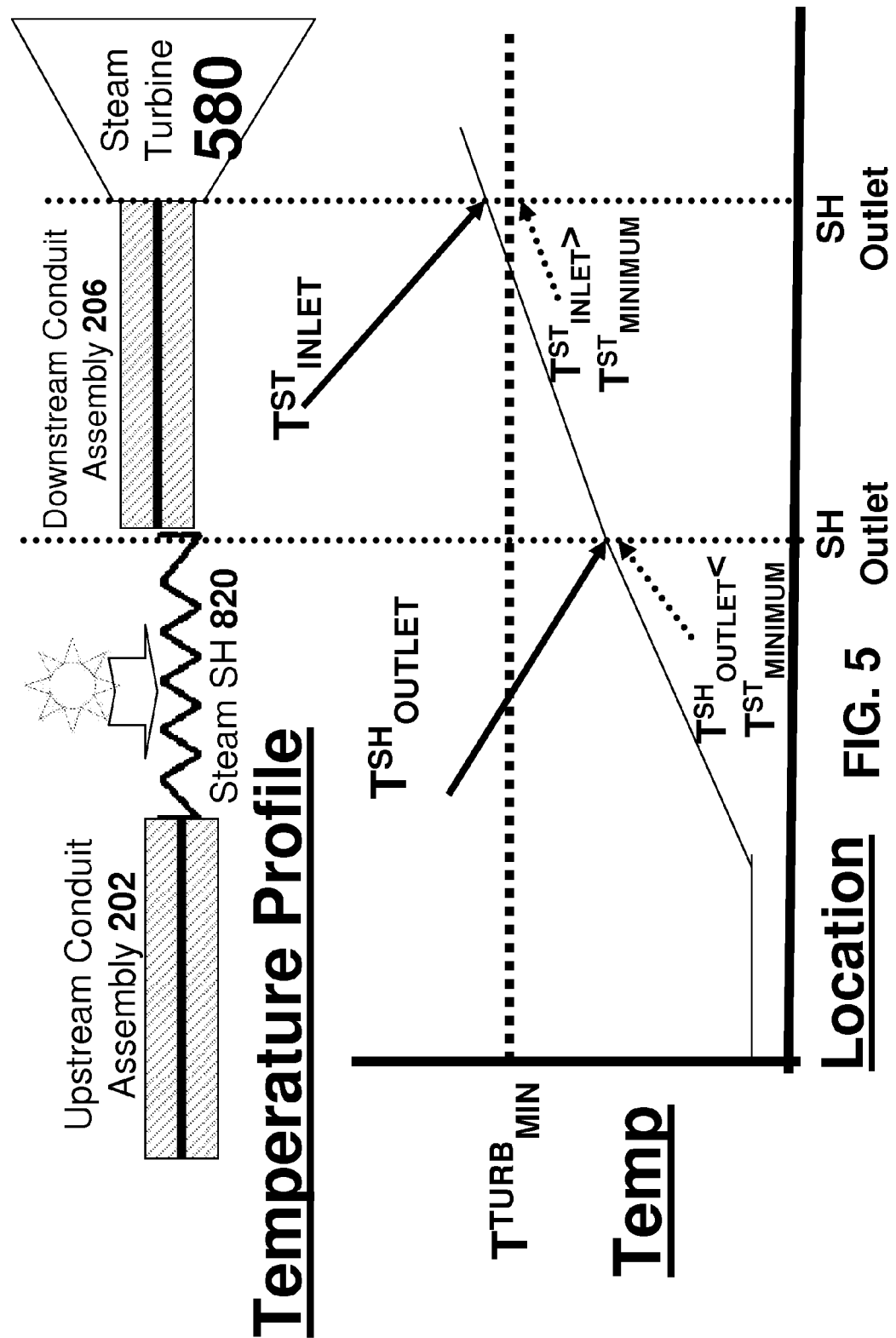
FIG. 5 illustrates a temperature profile, according to one or more embodiments of the disclosed subject matter.

A Discussion of FIG. 5

FIG. 5 illustrates, according to one non-limiting example, a temperature profile that prevails within a solar steam system at a time of step S309. The example of FIG. 5 relates to the specific case of linear temperature profiles—there is no representation that linear temperature profiles prevail, and certainly no attempt to limit to linear temperature profiles. Instead, linear profiles are illustrated in FIG. 5 for the sake of simplicity.

As is evident from FIG. 5, during the time of FIG. 5, the temperature increase within steam superheater is inadequate for 'crossing the steam turbine minimum operating temperature threshold.'

For the present disclosure, when steam 'crosses the steam turbine minimum operating threshold' $THRESH(T^{ST}_{MIN})$ of a steam turbine 580, the steam is heated from a first temperature that is below the minimum operating temperature $T^{ST}_{MIN}$ of the steam turbine to a second temperature that is equal to or exceeds the minimum operating temperature $T^{ST}_{MIN}$ of the steam turbine. Thus, 'crossing the threshold' refers to a change in temperature only and does not require the steam to be located at any specific location or to be associated with any specific flow or motion. In the example of FIG. 2B, the steam crosses the minimum operating temperature threshold $THRESH(T^{ST}_{MIN})$ within the steam superheater 820, while in the example of FIG. 5, the steam crosses the minimum operating temperature threshold $THRESH(T^{ST}_{MIN})$ within downstream conduit assembly 206.

In the non-limiting example of FIG. 5, steam superheater SH 820 is still operative to heat pressurized steam by insolation. However, this occurs only to a lesser extent than what was observable in step S301 and in a manner that is insufficient for crossing the steam turbine minimum operating temperature threshold. Mathematically, it is possible to write: $T^{SH}_{OUTLET} < T^{ST}_{MIN}$ and $T^{ST}_{INLET} > T^{ST}_{MIN}$.

In some embodiments, the pressure steam that enters steam superheater 820 does so at a 'phase change' temperature—for example, a 'boiling point' of pressurized water or a 'critical temperature' for supercritical steam. In some embodiments, during step S309, a 'significant percentage' of the temperature increase between a 'phase change' temperature and the minimum operating temperature of steam turbine 580 is supplied by stored enthalpy present within insulated conduit(s) of upstream 202 and/or downstream 206 conduit assemblies (rather than by an external enthalpy source such as insolation)—e.g. at least 10% or at least 20% or least 35% or at least 50% or at least 65% or at least 80% or at least 90% or at least 95%).

Embodiments where steam superheater 820 receives steam from a first solar receiver in which a phase change is carried out are discussed below with reference to FIGS. 9-12.

A Discussion of FIGS. 6A-6B.

In the example of FIG. 5 (and step S309), steam is heated within steam superheater 820—albeit to a lesser extent than what could be observed in step S301. In other examples related to step S309, it is possible that steam is not heated within solar steam superheater 820, or even cools within solar steam superheater 820 at a time of step S309.

FIGS. 6A-6B illustrate temperature of pipe walls and steams respectively during steps S301 and S309. In the example of FIGS. 6A and 6B, the location within conduit assembly 206 is in the 'proximal portion' close to the outlet of the steam superheater SH 820.

At time $t_1$ (before the level of insolation upon superheater 820 begins to decrease) the temperature of steam that (i) exits steam superheater 820 and (ii) enters conduit assembly 206 is $(T^{SH}_{OUTLET})_{INITIAL}$. This exceeds the minimum temperature required to operate steam turbine 580 $T^{ST}_{MIN}$.

At this time, the temperature of the inner surface wall of conduit(s) 206 is $T_{INITIAL}^{WALL}$. In some embodiments, at this time the steam within conduit(s) of assembly 206 and the walls of conduit(s) of assembly 206 are substantially in thermal equilibrium, and the temperature gap between the inner wall of the conduit and the steam flowing therein is $TEMP\_GAP_{INITIAL} = |(T^{SH}_{OUTLET})_{INITIAL} - T_{INITIAL}^{WALL}|$. Since this temperature $T_{INITIAL}^{WALL}$ is significantly hotter than the temperature outside of the insulation of the conduit(s), the walls of conduit(s) store enthalpy that is provided by solar steam flowing through the conduit.

FIG. 6B illustrates the same 'proximal region of conduit assembly 206 at a later time $t_2$ after the level of insolation re-directed to walls of steam superheater 820 has begun to decrease (e.g. in step S309). Thus, in this example, the temperature of steam $(T^{SH}_{OUTLET})_{LATER}$ drops by at least 10 or 20 or 30 or 40 or 50 or 100 degrees Celsius (i.e. relative to $(T^{SH}_{OUTLET})_{INITIAL}$) within a relatively 'short' period of time (i.e. within 30 minutes or 20 minutes or 10 minutes or 5 minutes or 3 minutes), thereby providing a rate of temperature drop (i.e. of the steam exiting the solar superheater or downstream 820 solar receiver) at a rate of at least 0.5 or 1 or 3 or 5 or 10 or 15 or 20 degrees Celsius/minute for a period of time lasting at least 1 or 3 or 5 or 10 minutes. At the time of FIG. 6B, the temperature $(T^{SH}_{OUTLET})_{LATER}$ is less than the minimum operating temperature of steam turbine 580.

As illustrated in FIG. 6B, in step S309, the temperature of the steam introduced into conduit(s) of assembly 206 from the superheater or downstream 820 solar receiver may drop at a faster rate than the temperature of the inner wall due to the dropping or reduced level of ambient insolation or other reasons such as the diverting of heliostats away from solar steam superheater 820 (see the discussion below with reference to FIGS. 8-12).

The inner wall of an insulated conduit of assembly 206, however, retains additional heat from the earlier time of FIG. 6A and step S301. This causes a thermal gradient between the flowing steam and the inner surface of the pipe wall, increasing gap temperature TEMP_GAP by at least 10 or 20 or 30 or 50 or 100 degrees Celsius, and/or by a factor of 2 or 5 or 10 or 100 when comparing $TEMP\_GAP_{LATER}$ with $TEMP\_GAP_{INITIAL}$.

The thermal gradient between the flowing steam and the inner wall of a conduit of assembly 206 causes heat to flow as illustrated in FIG. 6B—the cooler steam of step S309 receives heat from the pipe wall (thus it may be said that the pipe wall superheats the steam) while the cooler steam concomitantly cools the pipe wall. In some embodiments, the steam may be heated within conduit assembly (i.e. the difference in steam temperature entering assembly 206 from superheater 820 and leaving assembly 206 into turbine 580) by at least 10 or 30 or 50 or 70 or 90 degrees Celsius. In some embodiments, the wall of conduit assembly may cool (i.e. due to the flow of the now cooler steam) by at least 10 or 20 or 30 or 50 or 70 or 90 degrees Celsius during a time period that is at most 60 or 30 or 20 or 10 minutes of step S309.

Figure 7:
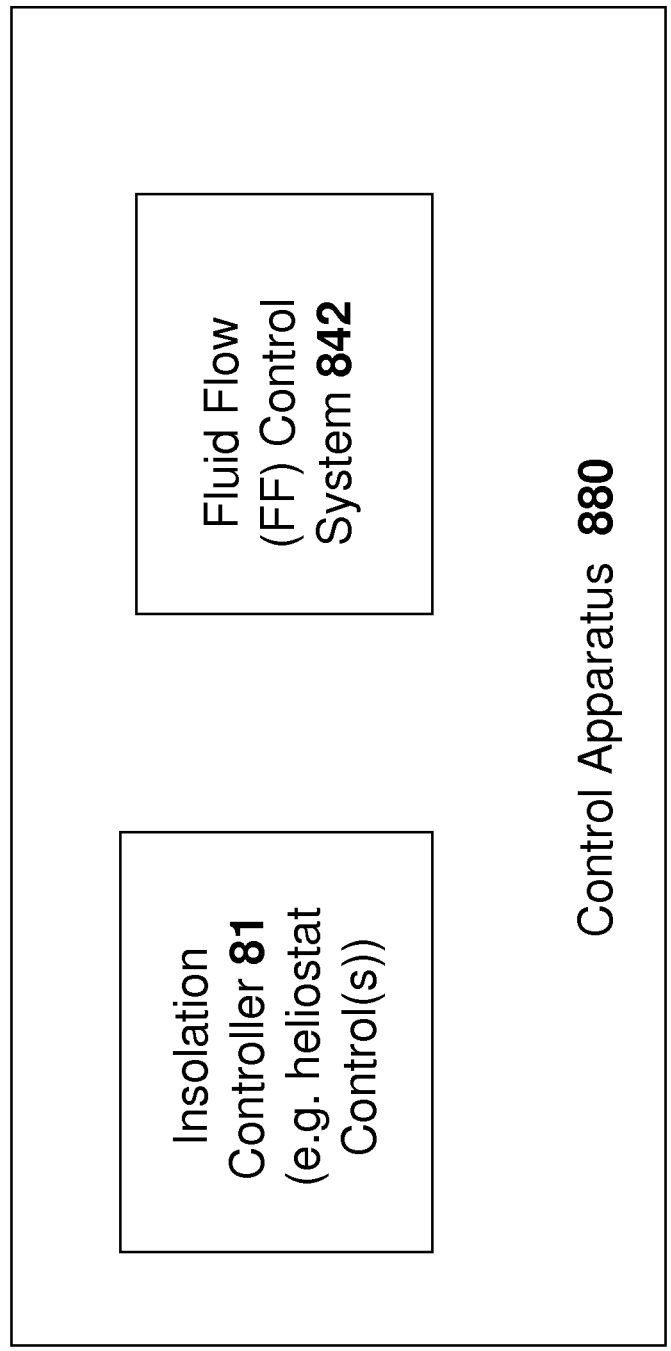
FIG. 7 illustrates control apparatus according to, according to one or more embodiments of the disclosed subject matter.

A Discussion of FIG. 7

Reference is now made to FIG. 7 which is a schematic block diagram of control apparatus 880 configured to regulate flow and/or insolation properties of a solar steam system. In the particular non-limiting example, of FIG. 7, control apparatus 800 includes an insolation controller 81 and a fluid flow control system 842. Insolation controller 81 may at least partially regulate a quantity of insolation that is re-directed onto superheater 820, and hence an outlet temperature of the steam superheater. When a greater (lesser) fraction of available insolation is directed to steam superheater SH 820 (i.e. as opposed to other targets), this facilitates a situation where the outlet temperature $T^{SH}_{OUTLET}$ of steam superheater SH 820 is higher (lower). One non-limiting example of insolation controller 81 is a heliostat control system discussed below with reference to FIG. 13.

Fluid flow control system 842 may include any combination of mechanical and/or electrical components for regulating fluid flow within a solar steam system. Exemplary components include but are not limited to pumps, valves, analog or digital electronic circuitry, and software. For example, steam turbine 580 may include a turbine inlet configured to control pressure and/or flow rate of fluid entering turbine 580—for example by controlling the flow resistance such as a valve control or other suitable device.

In some embodiments, one or more of these control systems (i.e. 81 and/or 842) or portions thereof are responsive to control signal(s)—i.e. electrical or electronic control signals. For example, step S301 may be carried out in accordance with a first control signal—for example, a signal that opens the inlet to steam turbine 580 and/or generates enough flow rate of solar steam into superheater 580 and/or directs enough insolation to superheater to heat steam to a specific temperature. Similarly, step S309 may be carried out according to second control signal(s) and/or step S313 may be carried out according to third control signal(s).

Figure 8:
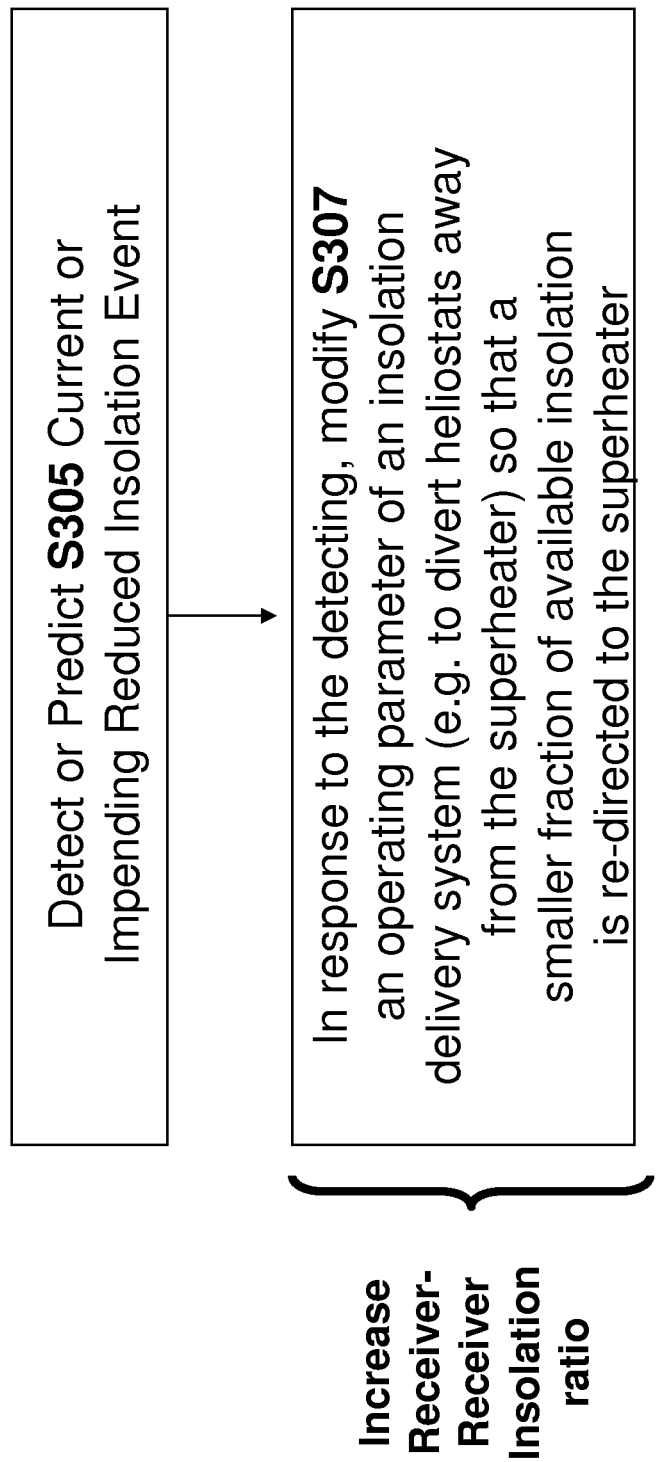

A Discussion of FIG. 8

FIG. 8 is a flow chart of a routine for operating a solar steam system. In step S305, a 'reduced insolation event' is detected or predicted—for example, by observing cloud cover or by correlating with the 'time of the day' to determine a time difference between a current time and sunset.

In step S307, in response to the detecting, an operating parameter of an insolation delivery system (e.g. a plurality of heliostats) is modified—for example, by insolation control system 81. For example, the number of heliostats that were previously aimed to the superheater 820 may be reduced, and in some embodiments, these heliostats may be re-aimed at another target other than superheater 820.

Embodiments of the disclosed subject matter relate to methods, system and apparatus where insolation is redirected away from superheater 810 in response to a detected or predicted reduction in insolation. When insolation is re-directed away from superheater 820, one or more heliostats that were formerly directed to superheater 820 are directed to a new target (e.g. an upstream receiver—see the discussion below).

When heliostats are re-aimed to re-direct insolation away from superheater 820, this is referred to as a 'net migration of' heliostats away from superheater 820.

One example of a 'net migration' is a 'net migration by number'—i.e. after the 'net migration event' (e.g. which is carried out in step S307) fewer heliostats are aimed to the superheater 820 than before the 'net migration event.' Thus, if the number of heliostats aimed to the superheater 820 before step S307 is equal to $N^{SH}_{PRE}$, and the number of heliostats aimed to the superheater 820 after step S307 is equal to $N^{SH}_{POST}$, and a $N^{SH}_{POST}-N^{SH}_{PRE}$ is negative, this describes a net migration of heliostats away superheater 820.

The time before step S307 is $t_{PRE}$ and the time after step S307 after some or all of the 'migrating' heliostats have been re-oriented is $t_{POST}$. The 'time gap' of migrating heliostats $t_{POST}-t_{PRE}$, in different embodiments, is at most 30 minutes or at most 20 minutes or at most 15 minutes or at most 10 minutes or at most 5 minutes.

In different embodiments, the 'strength' of the migration may be quantified by $$\frac{|N^{SH}_{POST}-N^{SH}_{PRE}|}{N^{SH}_{PRE}}$$

which in different embodiments may be at least 0.05 or at least 0.1 or at least 0.2 or at least 0.3 or at least 0.5 or at least 0.7 or at least 0.8 or at least 0.9 for example, when the time gap $t_{POST}-t_{PRE}$ has any property described in the previous paragraph.

Another example of a 'net migration' is a 'net migration by flux'—i.e. the re-aiming of step S307, to a new target (i.e. a target other than superheater 820), of one or more heliostats that were formerly aimed to superheater 820, causes less flux to be re-directed to superheater 820 than before the 'net migration event.' The reduction of flux onto superheater 820 due heliostat migration is different from the flux reduction attributable to diminishing ambient insolation. Thus, migration of heliostats away from superheater 820 causes the level of flux incident upon superheater 820 to diminish at a rate that is faster than what is attributable to diminishing ambient insolation alone.

For embodiments related to a 'net migration of flux,' as a result of re-aiming one or more heliostats that were formerly (i.e. before a time of step S307) aimed to steam superheater 820, the level of flux incident upon superheater 820 diminishes at a rate faster than a rate at which ambient insolation decreases and diminishes at a rate faster than what would be observed if there is no migration of heliostats (i.e. what would be observed if the same heliostats stay aimed to superheater 820 without adding or removing heliostats).

There is no limitation on the 'destination' to which heliostats may be aimed after they are re-directed away from superheater 820. Optionally, and in some embodiments preferably, the heliostats are aimed to an upstream receiver in which insolation is used to effect a phase change (e.g. to evaporate pressurized water into pressurized steam or to generate supercritical steam).

More details are provided in the discussion below discussed below with reference to FIGS. 9-12.

Figure 9A:
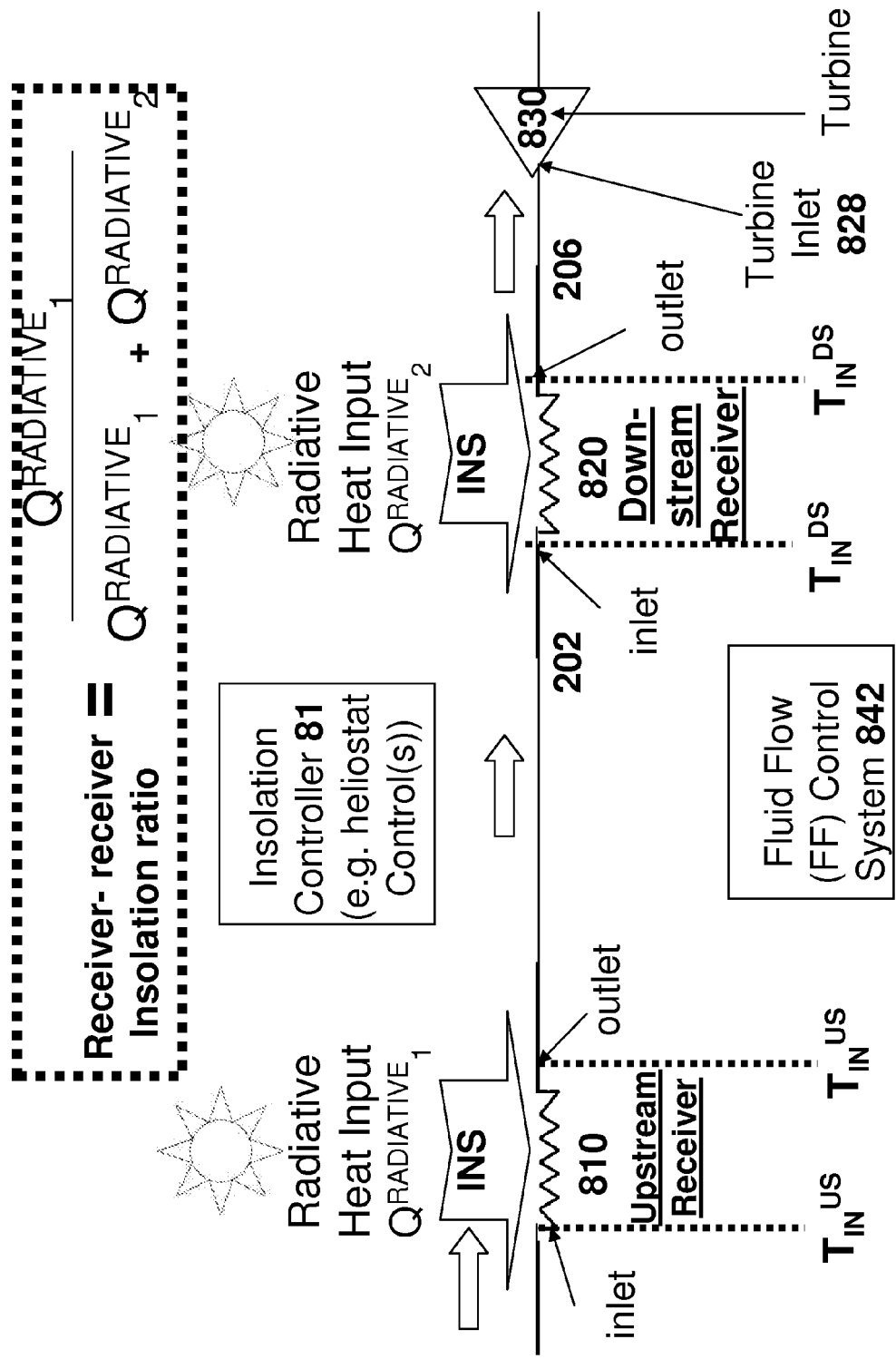
FIGS. 9A-9B illustrate a system including a plurality of solar receivers, according to one or more embodiments of the disclosed subject matter.
Figure 9B:
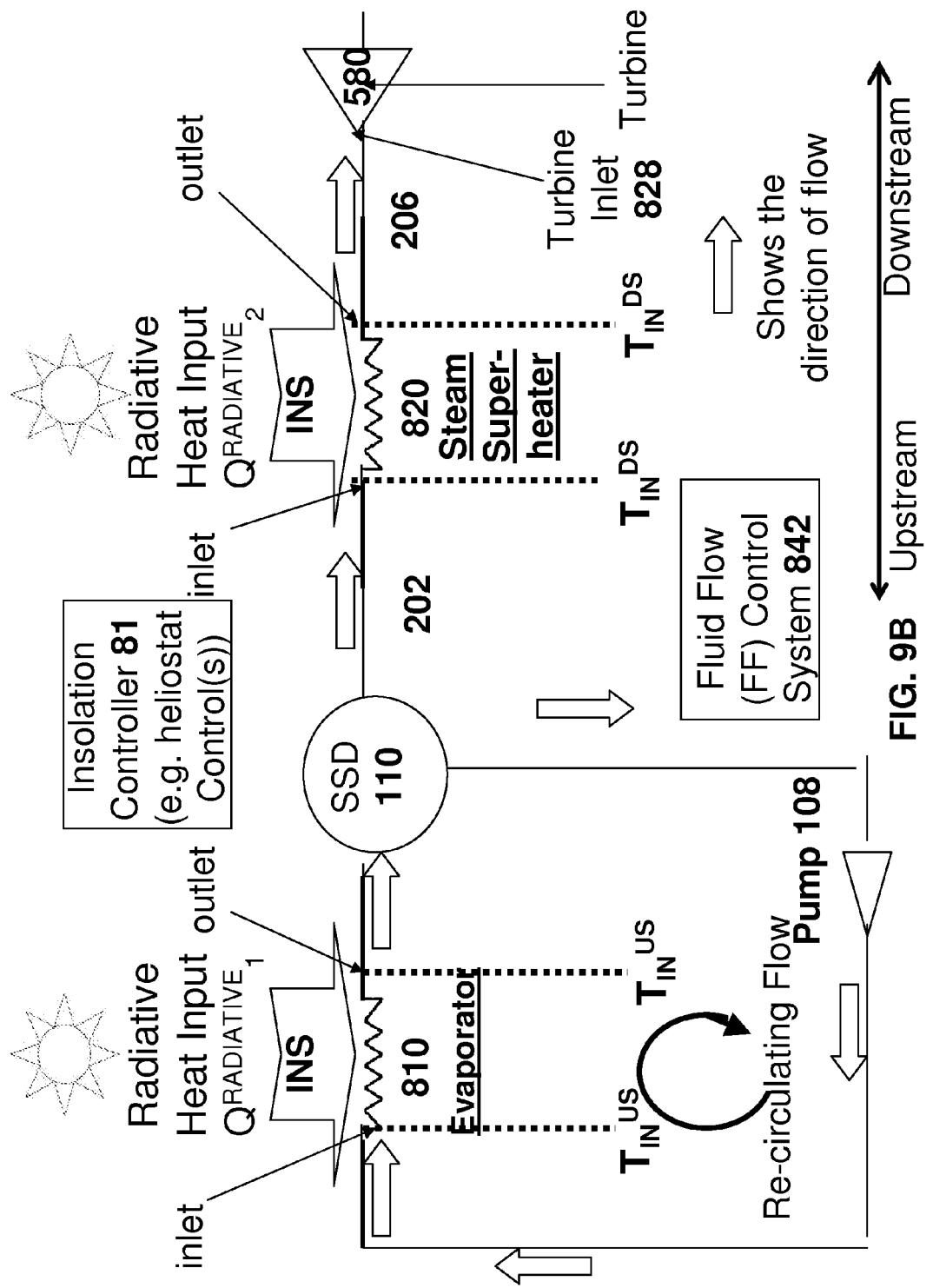

A Discussion of FIGS. 9A-9B

As illustrated in FIGS. 9A-9B, solar steam system includes a first solar receiver 810 (for example, configured as an 'upstream solar receiver') and second solar receiver 820—as noted above, the second solar receiver 820 may be a solar steam superheater. Additional solar receivers may be present—alternatively, fewer solar receiver may be present.

In different embodiments, receiver 810 is a solar evaporator configured to boil water into steam, or receiver 810 is a super-critical steam generator configured to generate super-critical steam by heating water or steam to a temperature above a super-critical temperature. The solar evaporator 810 receives liquid and/or water vapor via an input line. The second solar receiver 820 (for example, a solar steam superheater or a solar steam re-heater) further heats steam or super-critical steam received via line conduit assembly 202 generated by the upstream solar receiver 810. The further heated steam is delivered to a turbine 580 via conduit assembly 206. Under normal operating conditions, the steam in conduit assembly 202 is drier than the steam in conduit assembly 206.

In different embodiments, a portion of line L1 corresponds to upstream conduit assembly 202, while line L2 corresponds to downstream conduit assembly 206.

For the present disclosure, it is understood that the term 'turbine' refers to a 'large scale turbine'—for example, whose power output is on the order of magnitude of a megawatt or more. In different embodiments, the power output of the turbine may be at least 1 megawatt, at least 5 megawatts, at least 10 megawatts, at least 50 megawatts or at least 100 megawatts or more.

The terms 'upstream' and 'downstream' relate to system configurations that are associated with some embodiments, and are not intended as limiting.

In certain locations in the present disclosure, upstream receiver 810 is referred to as a 'solar boiler/evaporator' or 'solar evaporator.' It is noted that this is not limiting, and in other examples (even when not explicitly mentioned), upstream receiver 810 (or any receiver labeled as '810') may be a solar supercritical steam generator which generates super-critical steam from liquid and/or vapor water.

It is understood that during normal operating conditions of full insolation, the temperature in the outlet of the steam superheater 820 is much hotter than the outlet temperature of the evaporator whose purpose is to convert liquid water (or a mixture of water and vapor) into steam. In different embodiments, the outlet temperature in the steam superheater 820 is at least 250 or 300 or 350 or 400 or 450 or 500 or 550 or 600 degrees Celsius.

In the example of FIG. 9B, receiver 810 is an evaporator/boiler, receiver 820 is a superheater and a steam separation vessel for separating between liquid and vapor phases (e.g. steam separation drum 110) resides between 810 and 820. In the example of FIG. 9B, solar steam evaporator 810 is configured as a re-circulating boiler (for example, including a pump 108 for re-circulating flow). Thus, liquid or vapor water may make several 'passes' through solar evaporator 810.

In some embodiments, steam separation vessel 110 (e.g. drum) substantially blocks water reaching the superheater 820. This may prevent damage in the short or long term. Blocking may also have the advantage of improving thermal efficiency.

In embodiments, steam separation vessel 110 is specifically a drum, though any dimensions or shape or form factor, for example effective to separate water vapor and liquid water, may be used.

In addition to the fluid flow control system 842 discussed above, a solar thermal system may also include a heliostat control system for 81 controlling the mechanical behavior of heliostat(s)—see the discussion provided below with reference to FIGS. 10A-10E.

A Discussion of FIGS. 10A-10E

FIGS. 10A-10E illustrate in various examples heliostats which aim reflected beams of sunlight at either the upstream 810 or downstream 820 solar receiver. In the non-limiting example of FIGS. 10A-10C only six heliostats are illustrated—it is appreciated that any number of heliostats may at a given time be aimed at the upstream or downstream solar receiver—for example, fewer than 100, or 10-1,000 heliostats or 1,000-10,000 heliostats or more than 10,000 heliostats.

Figure 10A:
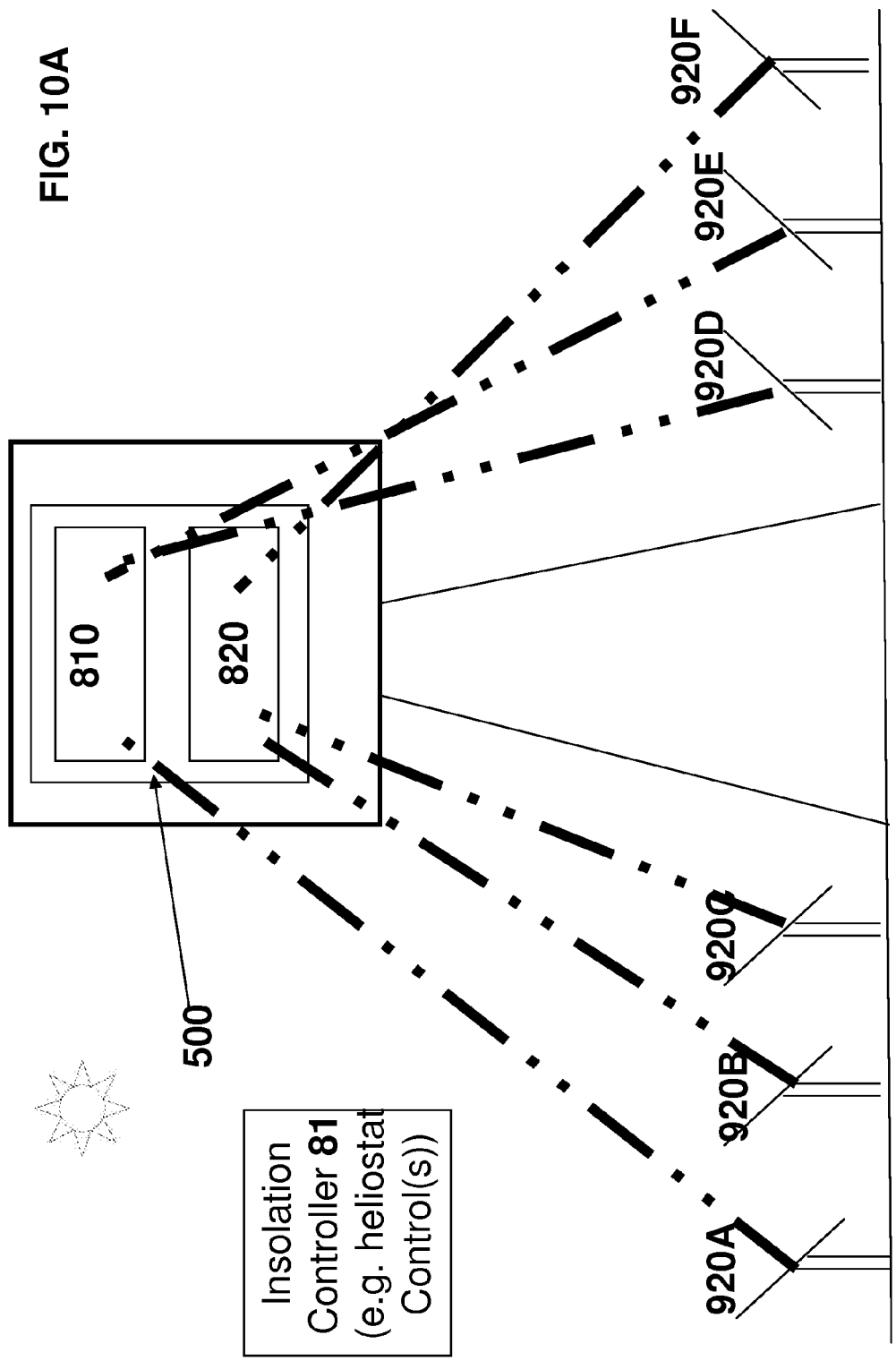

In the illustrated example of FIG. 10A, the set of heliostats aimed at one or the other solar receivers (810 or 820) is {920A, 920B, 920C, 920C, 920D, 920E, 920F}. In FIG. 10A, the sub-set of heliostats aimed at 810 is {920A, 920D, 920E} and the sub-set of heliostats aimed at 820 is {920B, 920C, 920F}.

Figure 10B:
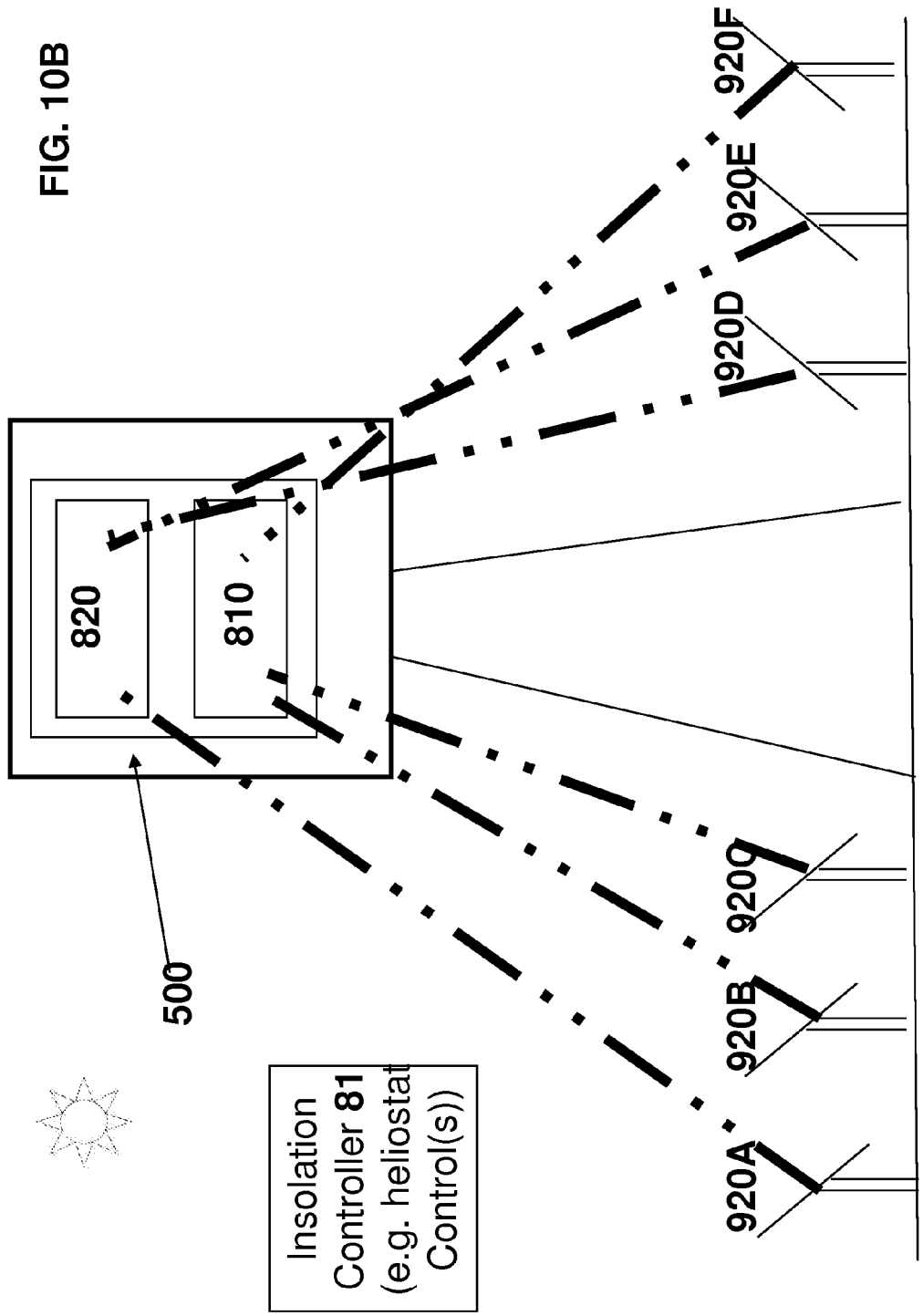

In the example of FIG. 10A, upstream receiver 810 is above downstream receiver 820. In the example of FIG. 10B, upstream receiver 810 is below downstream receiver 820. The example of FIG. 10C relates to a 'side-by-side' configuration.

Figure 10D:
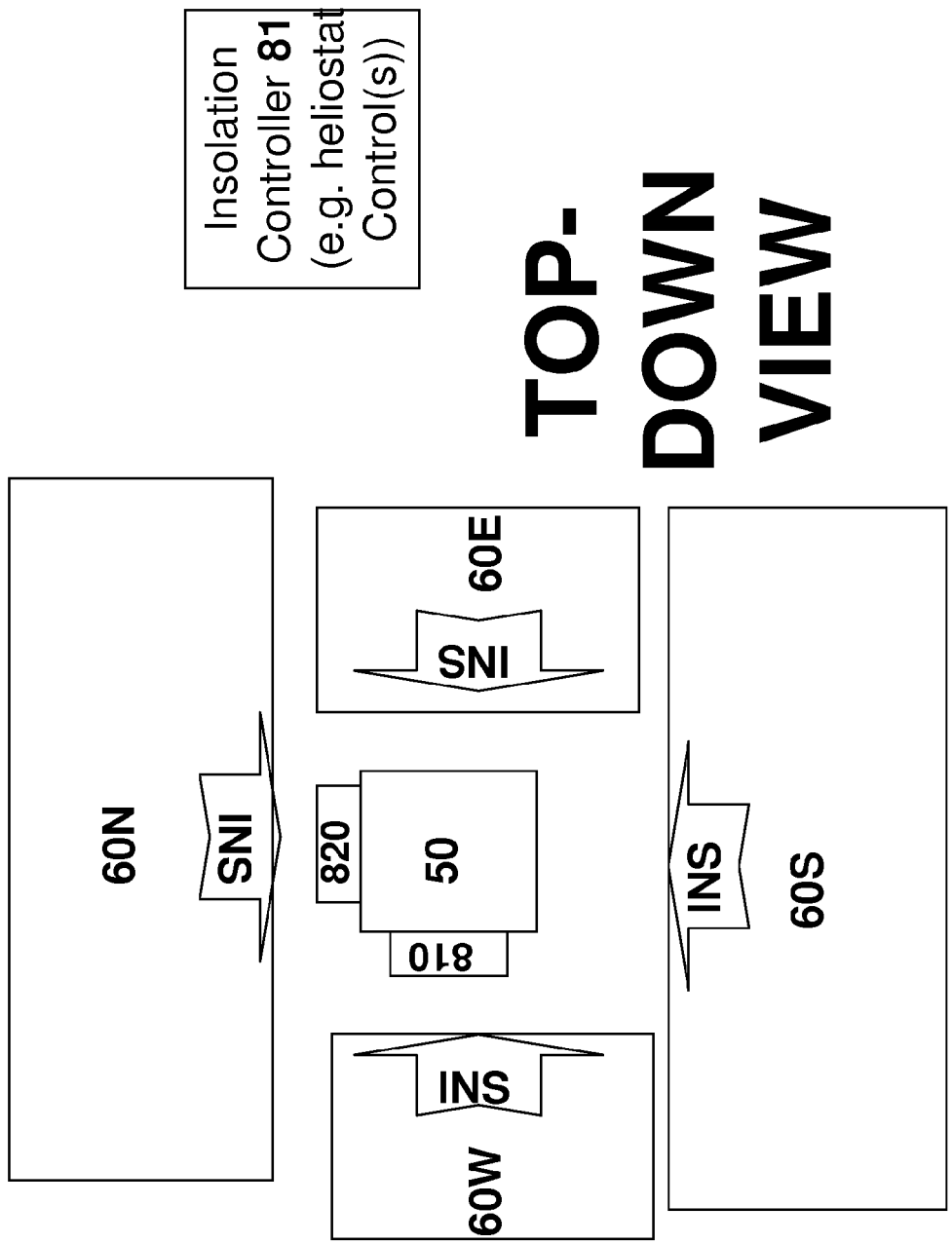

FIG. 10D is a plan view of a system where upstream receiver 810 and downstream receiver 820 are on different sides of the tower 50. In the non-limiting example of FIG. 10D, (i) receiver 820 is mounted to a north face of tower 50 and receives insolation primarily from a northern field of heliostats 60N; and (ii) receiver 810 is mounted to a west face of tower 50 and receives insolation primarily from a western field of heliostats 60W.

In the example of FIGS. 10A-10D, two solar receivers (810 and 820) are on tower 50, however more than two solar receivers may be on the tower in other embodiments.

Figure 10E:
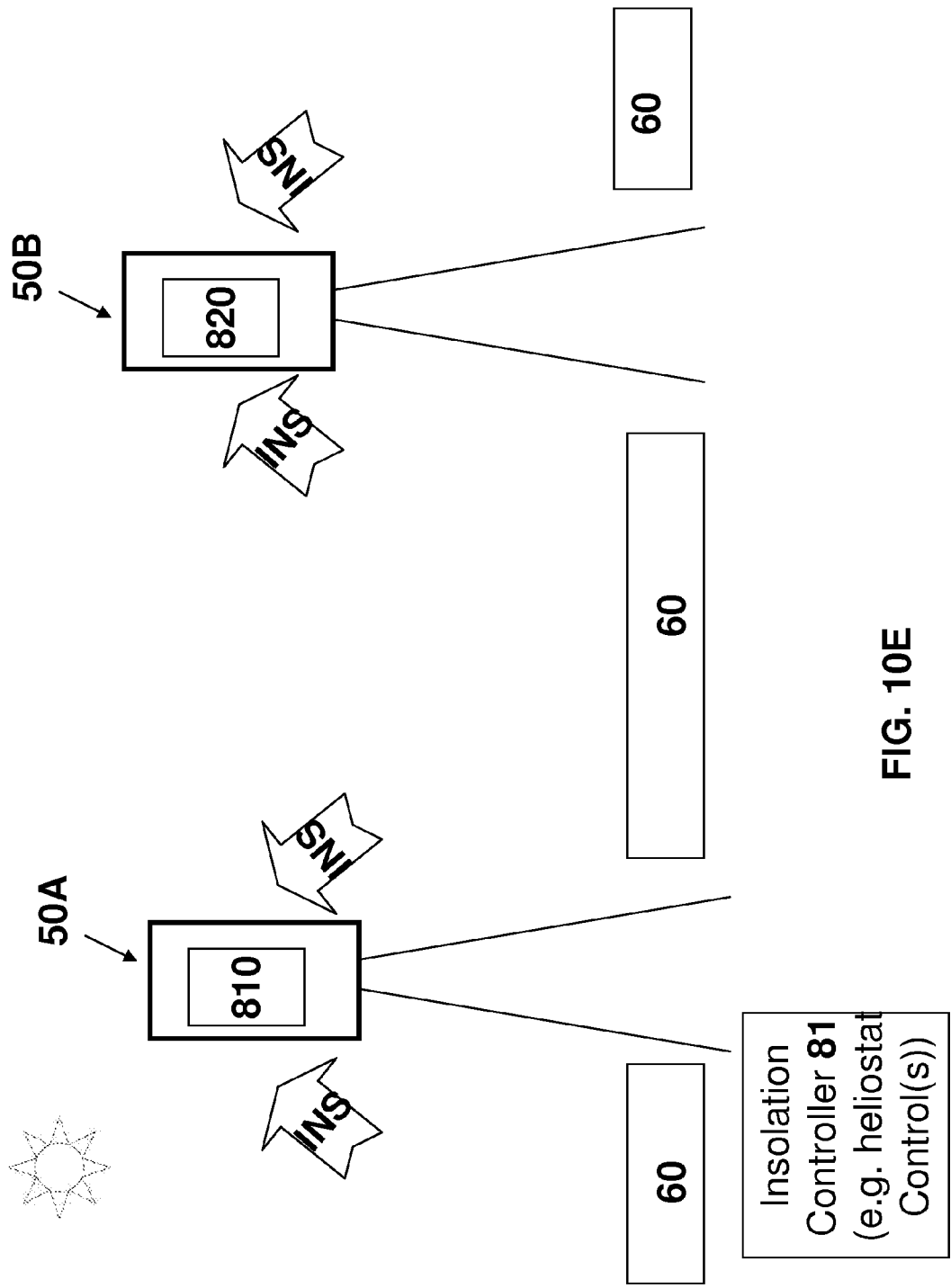

In the example of FIG. 10E, there are a plurality of solar towers 50, each tower being associated with a respective solar receiver. At any given time, a given heliostat may be directed to a solar receiver of any one of the towers. Examples of a suitable multi-tower system include the tower systems disclosed in co-pending U.S. application Ser. No. 12/532,942, filed Apr. 2, 2010 and entitled "Distributed Power Towers with Differentiated Functionalities" (published as US 2010-0191378), which is hereby incorporated by reference. Other examples are also possible. For example, the receivers 810 and 820 may be discontinuous tiles forming a discontinuous set of many elements of any shape, such as a hexagon, and arranged in any relative relationship, such as diagonally displaced.

Figure 11A:
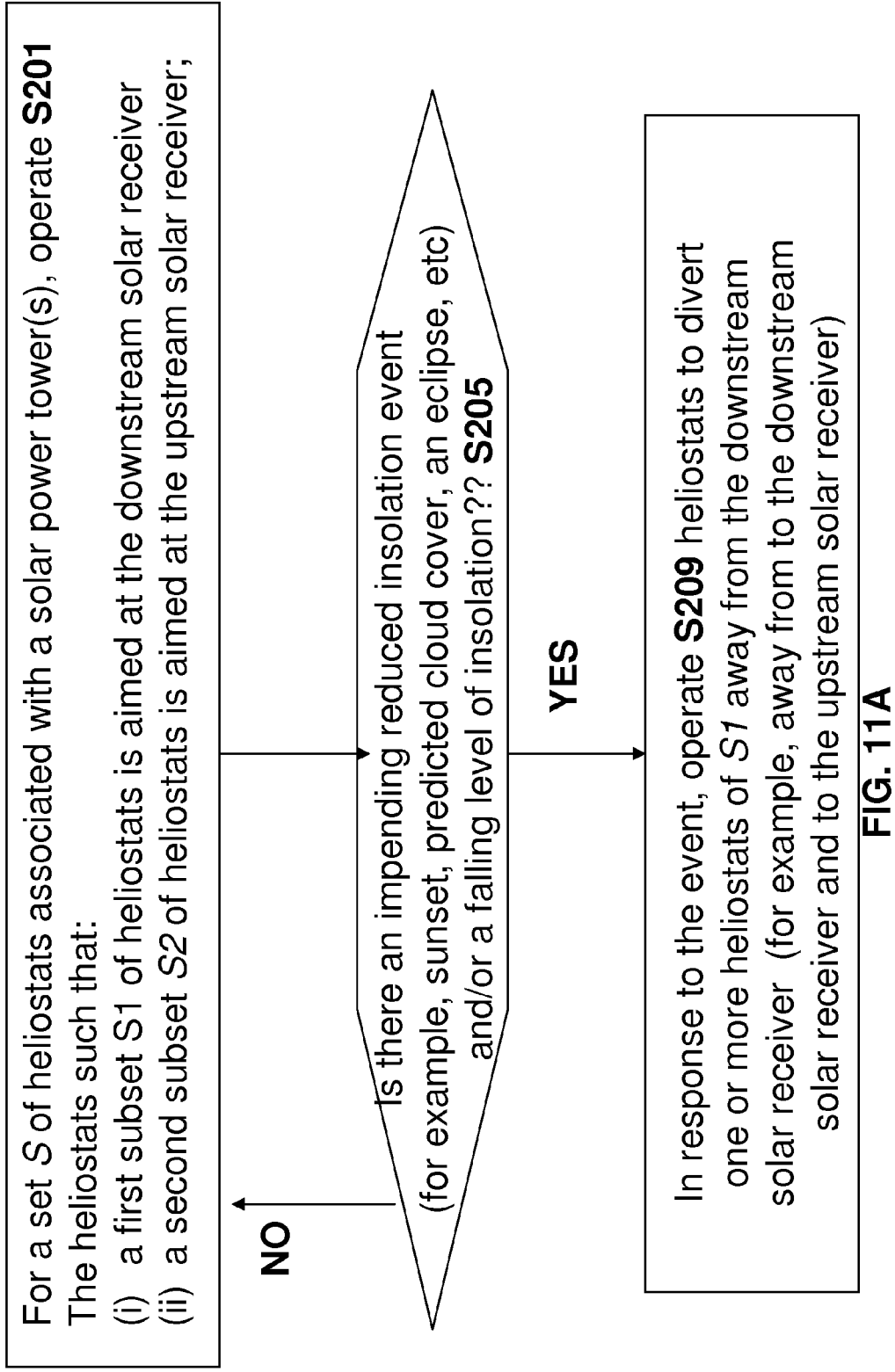
Figure 11B:
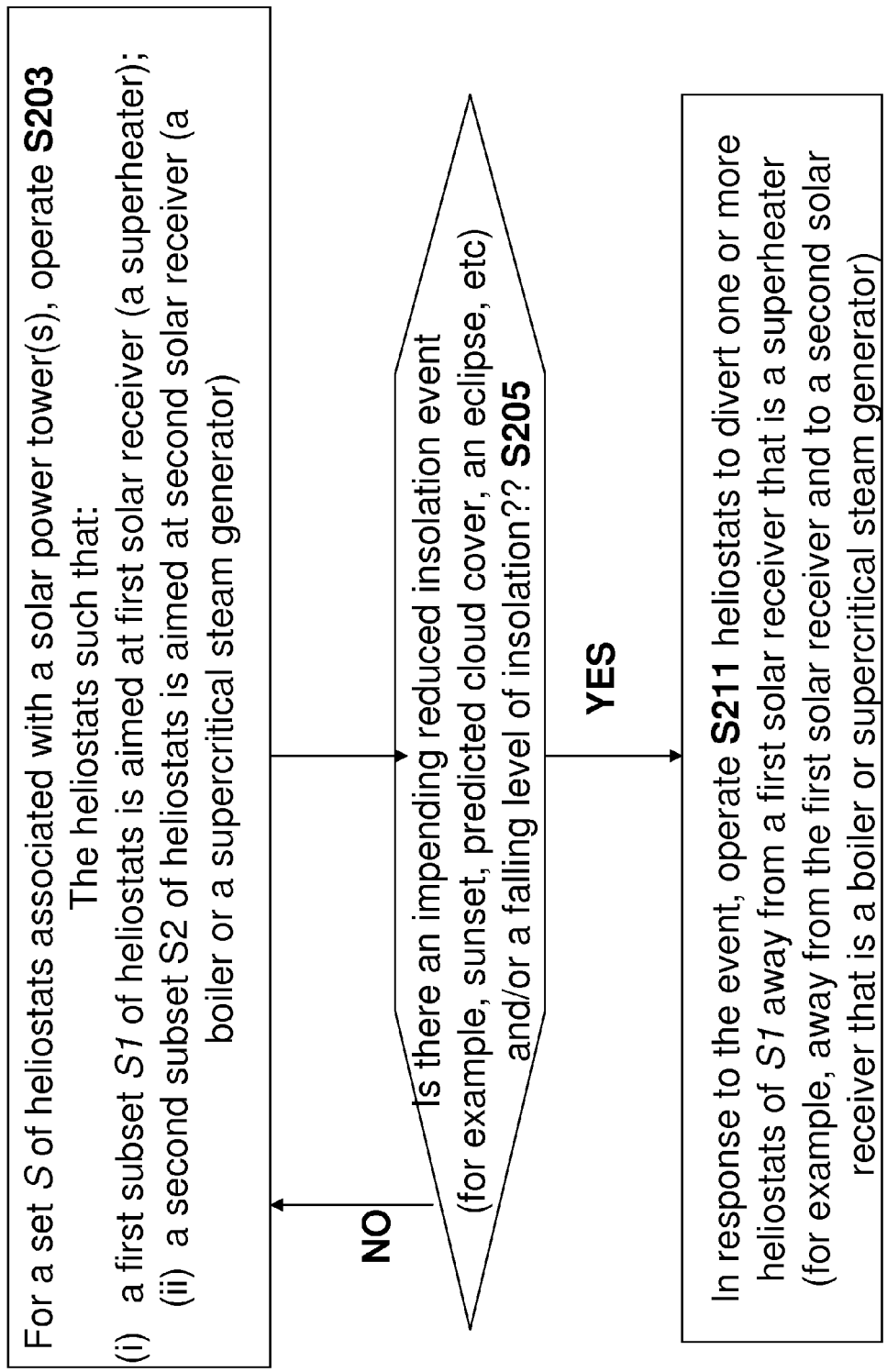

A Discussion of FIGS. 11A-11B

FIGS. 11A-11B show a flow chart of a routine for operating a solar steam system in accordance with some embodiments. For example, in some embodiments, the routines of FIGS. 11A-11B may be useful for diverting heliostats away from solar steam superheater 820 during a time of reduced insolation, as in FIG. 8.

In step S201, the set of heliostats S is operated so that a first sub-set S1 is aimed at the downstream solar receiver 820 and a second sub-set S2 is aimed at the upstream solar receiver 810.

In step S205, it is determined if there is an impending reduced insolation event and/or a falling level of insolation—for example, if it is late in the day (for example, fewer than X minutes before sunset, it may be assumed that the level of insolation has begun to drop and/or is about to drop). In another example, there is actual or predicted cloud cover or even rain. In this case, it may be useful to carry out step S209 in response to the impending reduced isolation event and/or falling level of insolation.

Thus, carrying out of step S209 is contingent upon a "YES" result of step S205. In step S209, at least some of the heliostats of S1 (i.e. that were previously aimed at the downstream solar receiver—for example, a superheater—in step S201) are diverted away from the downstream 820 solar receiver (i.e. so they no longer aim at the solar receiver). This may be useful, for example, in reducing the total amount of insolation provided to solar receiver above and beyond the reduction that would be observable if the heliostat deployment of step S201 were to continue to prevail during the time period of reduced insolation.

In some embodiments it may be advantageous to re-direct at upstream solar receiver 810 one or more of the diverted heliostats (i.e. that previously were aimed at downstream solar receiver 820). As will be discussed below in further detail, this may be useful for maintaining a minimum flow of steam through upstream conduit assembly 202 into downstream receiver 820 which receives steam from upstream receiver 810 (i.e. either directly or indirectly—e.g. via steam separation vessel 110).

Thus, in one non-limiting example, the upstream solar receiver 810 is a solar evaporator/boiler for evaporating pressurized water and the downstream solar receiver 820 is a superheater. In this non-limiting example, directing heliostats away from the superheater to the boiler at a time when the level of insolation is dropping would both (i) cause and/or accelerate any temperature drop of steam entering into downstream conduit assembly 206 and flowing towards turbine 580; and (ii) would cause solar evaporator/boiler 810 to generate more saturated steam than would have occurred otherwise without the heliostat diverting—i.e. the rate of steam flowing through upstream conduit assembly 202 towards downstream receiver 820 would either increase or decrease at a rate that is less than the rate observable in a system where the heliostats are not diverted as in step S209.

In some embodiments, diverting heliostats from the superheater 820 to the evaporator 810 serves to moderate a drop in steam production within evaporator 810 that occurs as a result of dropping insolation.

Thus, in some embodiments, step S309 of FIG. 4 is carried out at a flow rate that is at least 2.5% of at least 5% or at least 7.5% or at least 10% or at least 15% or at least 20% or at least 25% or at least 30% or at least 35% or at least 50% of a flow rate that prevails during step S301.

In some embodiments, during step S309, steam turbine 580 operates at more than 2.5% of more than 5% or more than 7.5% or more than 10% or more than 15% or more than 20% or more than 25% or more than 30% or more than 35% or more than 50% of its nominal rate capacity.

Figure 12A:
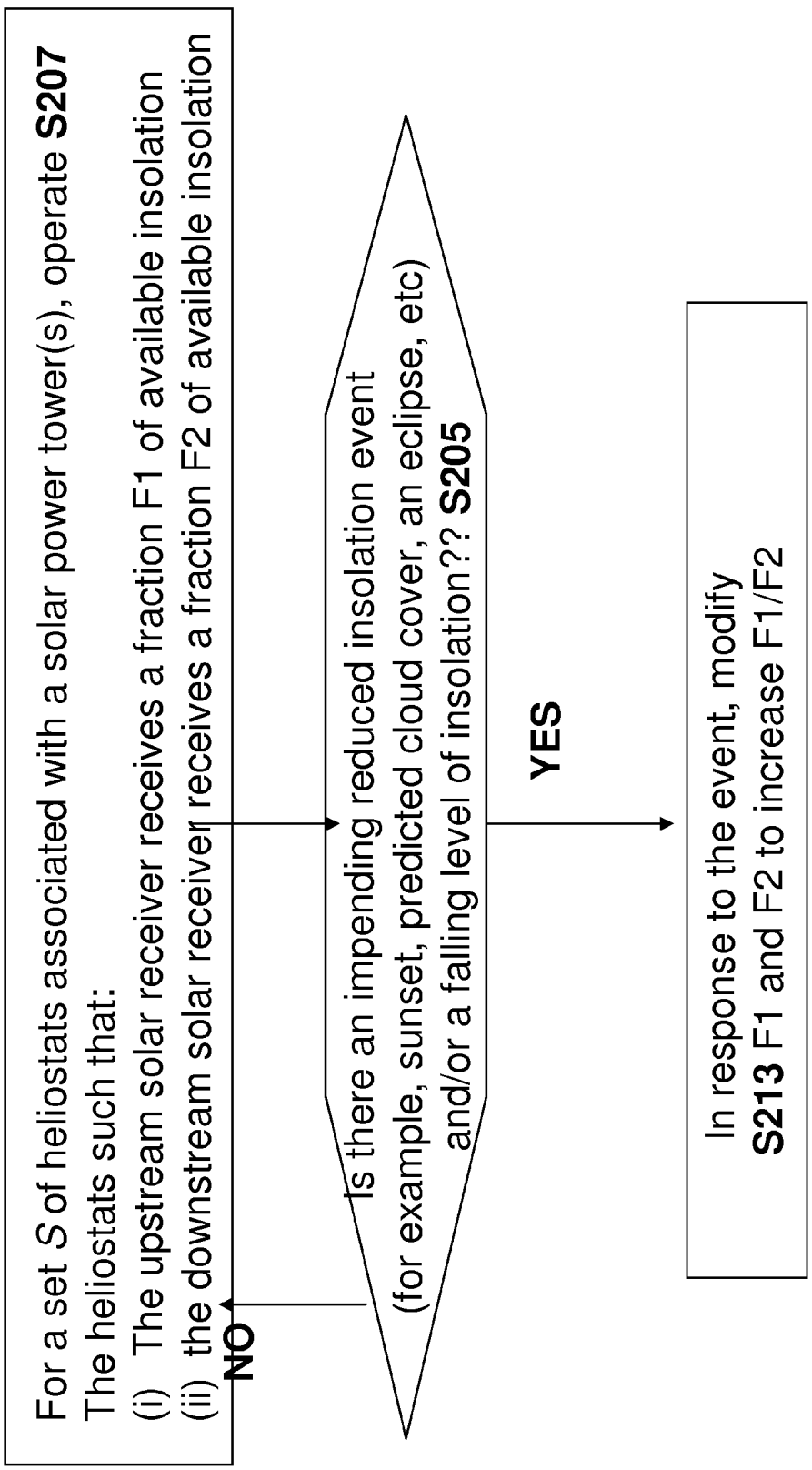
Figure 12B:
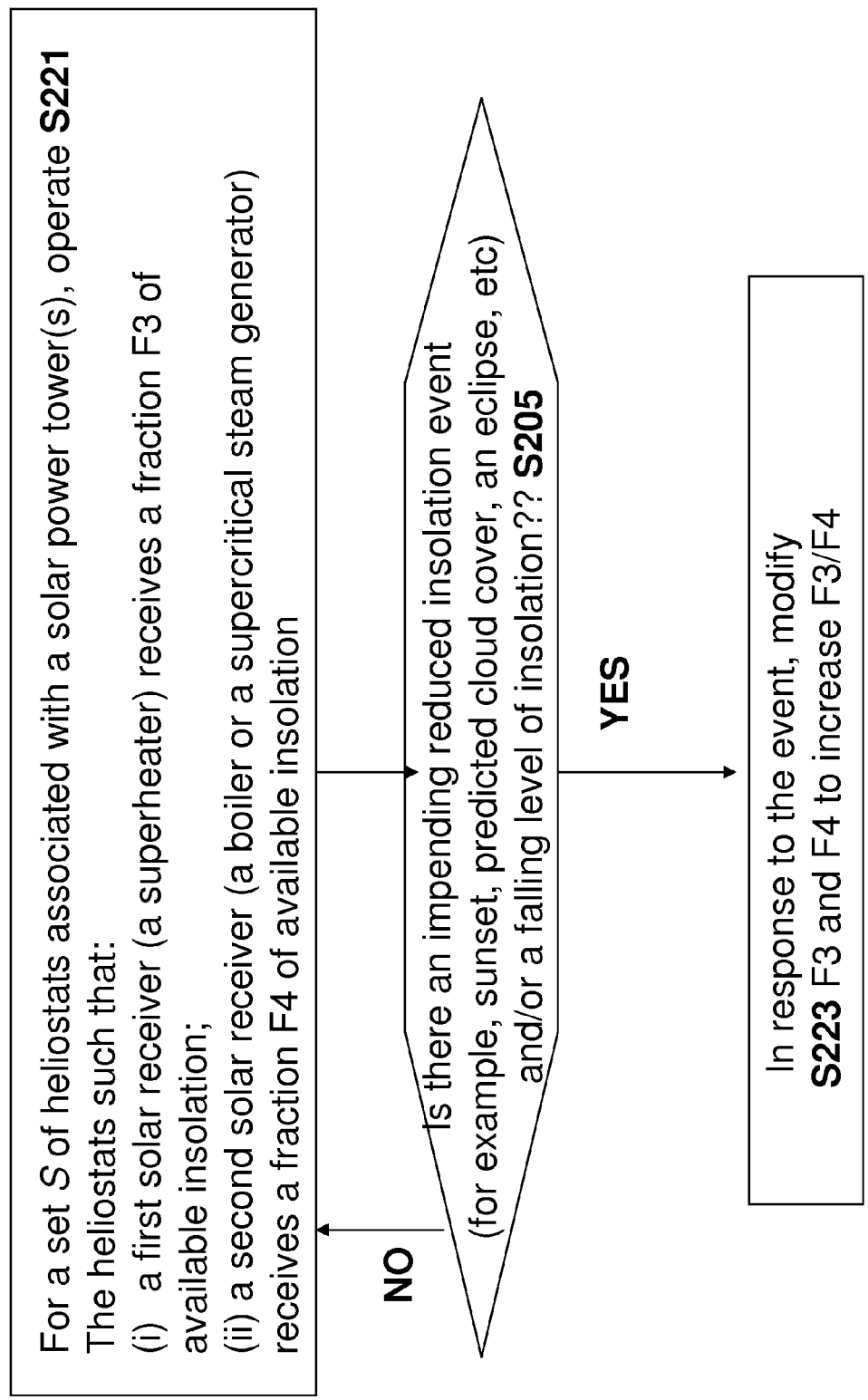

A Discussion of FIGS. 12A-12B

FIGS. 12A-12B are flow charts of routines for operating a solar thermal power system including a set of heliostats S.

Reference is now made to FIG. 12A. In step S207, the heliostats are operated such that (i) the upstream solar receiver receives a fraction F1 of available insolation; and (ii) the downstream solar receiver receives a fraction F2 of available insolation. Thus, in step S207, a first heliostat allocation policy is being enforced.

For the present disclosure, "available insolation" is relative to a set S of heliostats, and refers to insolation reflected by active or operational heliostats of the set S of heliostats. It is appreciated that the set of heliostats S does not necessarily refer to every heliostat or even every active heliostat, that is present in a field of heliostat near a solar tower or set of tower(s)—rather, the set of heliostats S just refers to a particular set of at least 5 or at least 10 or at least 20 or at least 50 or at least 100 or at least 1,000 heliostats.

In step S213, this policy is modified in response to the current or impending reduced insolation event (see step s205), so that the ratio F1/F2 changes relative to the value that prevailed in step S207.

Reference is now made to FIG. 12B. In step S221, the heliostats are operated such that (i) a first solar receiver (i.e. a superheater) receives a fraction F3 of available insolation; and (ii) a second solar receiver which is a boiler/evaporator or a steam superheater receives a fraction F4 of available insolation. As noted above, the first and second solar receiver may co-reside at the same solar tower 50—alternatively, the first and second solar receiver may reside in different solar towers. Thus, in step S221, a first heliostat allocation policy is being enforced.

In step S223, this policy is modified in response to the current or impending reduced insolation event (see step s205), so that the ratio F3/F4 changes relative to the value that prevailed in step S207.

Figure 13:
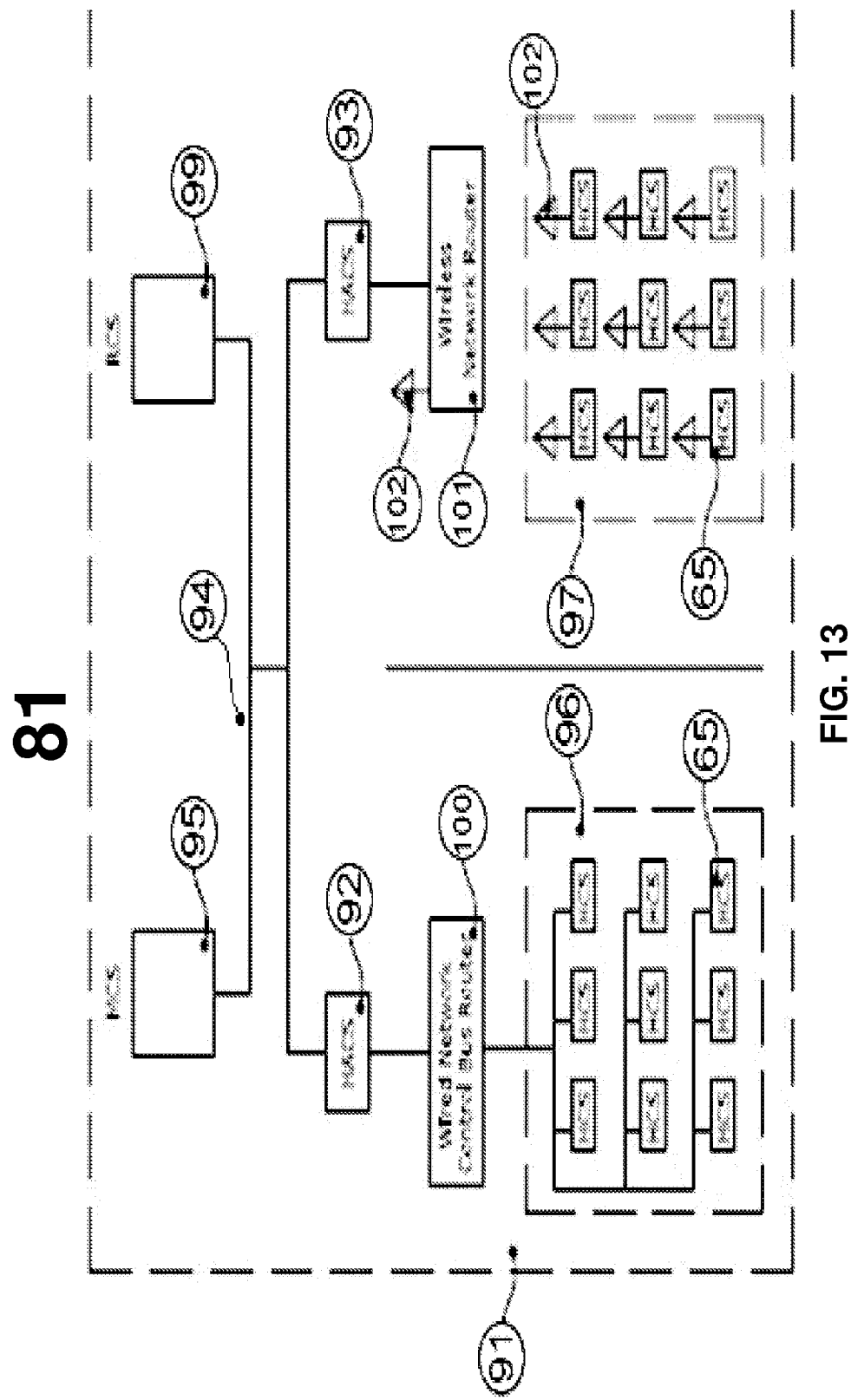
FIG. 13 illustrates a heliostat control system, according to one or more embodiments of the disclosed subject matter.

A Discussion of FIG. 13

FIG. 13 illustrates a heliostat field control system 81 in some embodiments—for example, configured to participate in any routine disclosed herein—for example, reference to any of FIGS. 4, 8, 11A-11B, and 12A-12B, alone or in combination.

In one example, a central heliostat field control system communicates hierarchically through a data communications network with controllers of individual heliostats. FIG. 13 illustrates an example of such a hierarchical control system 81 that includes three levels of control hierarchy, although in other implementations there can be more or fewer levels of hierarchy, and in still other implementations the entire data communications network can be without hierarchy, for example in a distributed processing arrangement using a peer-to-peer communications protocol.

At a lowest level of control hierarchy (i.e. the level provided by heliostat controller) in the illustration there are provided programmable heliostat control systems (HCS) 65, which control the two-axis (azimuth and elevation) movements of heliostats (not shown), for example as they track the movement of the sun. At a higher level of control hierarchy, heliostat array control systems (HACS) 92,93 are provided, each of which controls the operation of heliostats 38 in heliostat fields 96,97 respectively, by communicating with programmable heliostat control systems 65 associated with those heliostats 38 through a multipoint data network 94 employing a network operating system such as CAN, Devicenet, Ethernet, or the like. At a still higher level of control hierarchy a master control system (MCS) 95 is provided which indirectly controls the operation of heliostats in heliostat fields 96,97 by communicating with heliostat array control systems 92,93 through network 94. Master control system 95 further controls the operation of a solar receiver (not shown) by communication through network 94 to a receiver control system (RCS) 99. In the example illustrated in the figure, the portion of network 94 provided in heliostat field 96 is based on copper wire or fiber optics connections, and each of the programmable heliostat control systems 65 provided in heliostat field 96 is equipped with a wired communications adapter 76, as are master control system 95, heliostat array control system 92 and wired network control bus router 100, which is optionally deployed in network 94 to handle communications traffic to and among the programmable heliostat control systems 65 in heliostat field 96 more efficiently. In addition, the programmable heliostat control systems 65 provided in heliostat field 97 communicate with heliostat array control system 93 through network 94 by means of wireless communications. To this end, each of the programmable heliostat control systems 65 in heliostat field 97 is equipped with a wireless communications adapter 77, as are heliostat array control system 93 and wireless network router 101, which is optionally deployed in network 94 to handle network traffic to and among the programmable heliostat control systems 65 in heliostat field 97 more efficiently. In addition, master control system 95 is optionally equipped with a wireless communications adapter (not shown).

In some embodiments, the controller system 81 of FIG. 13 is programmed to participate in any routine disclosed herein.

Figure 14A:
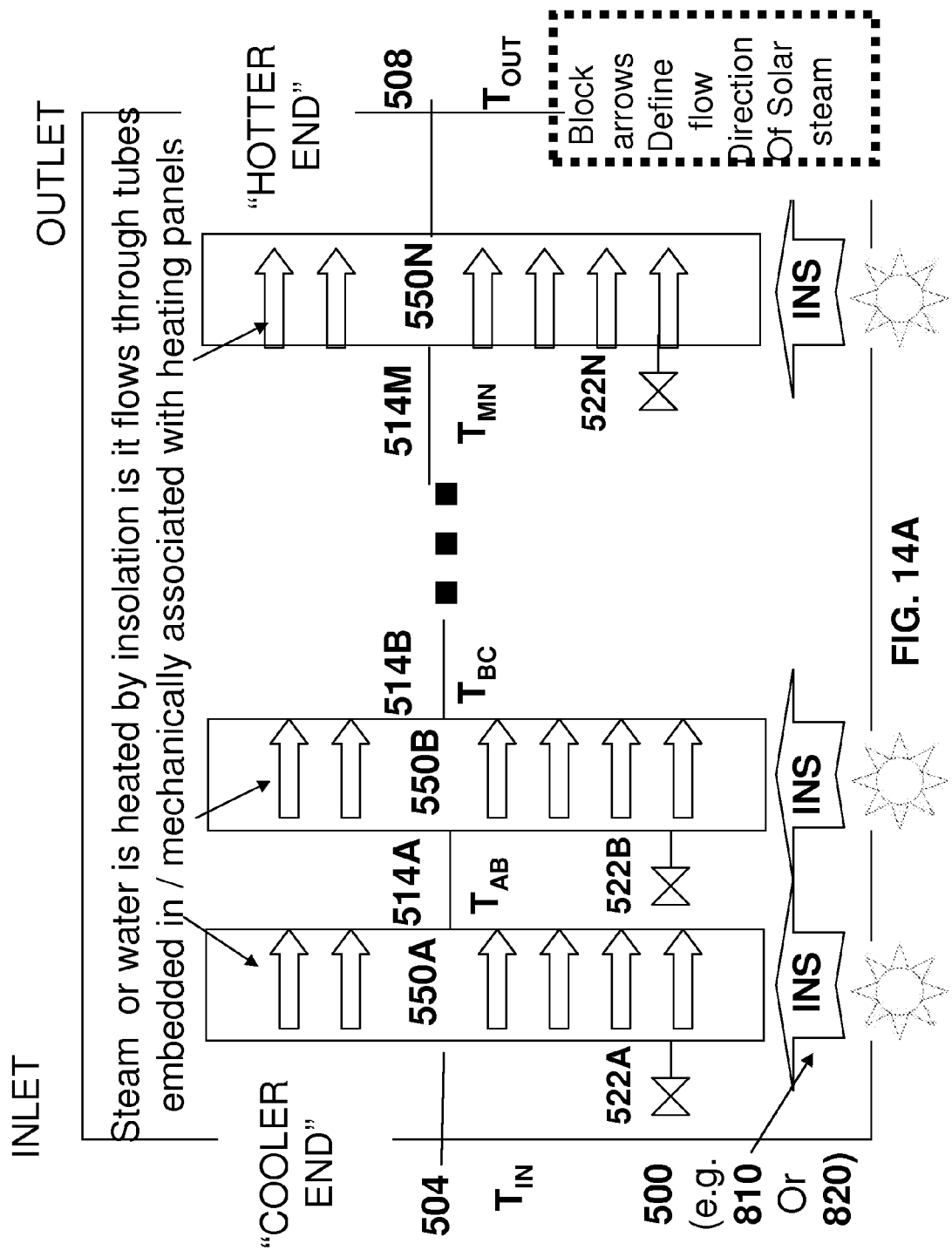
FIGS. 14A-14B illustrate a solar receiver (e.g. evaporator, supercritical steam generator or superheater), according to one or more embodiments of the disclosed subject matter.
Figure 14B:
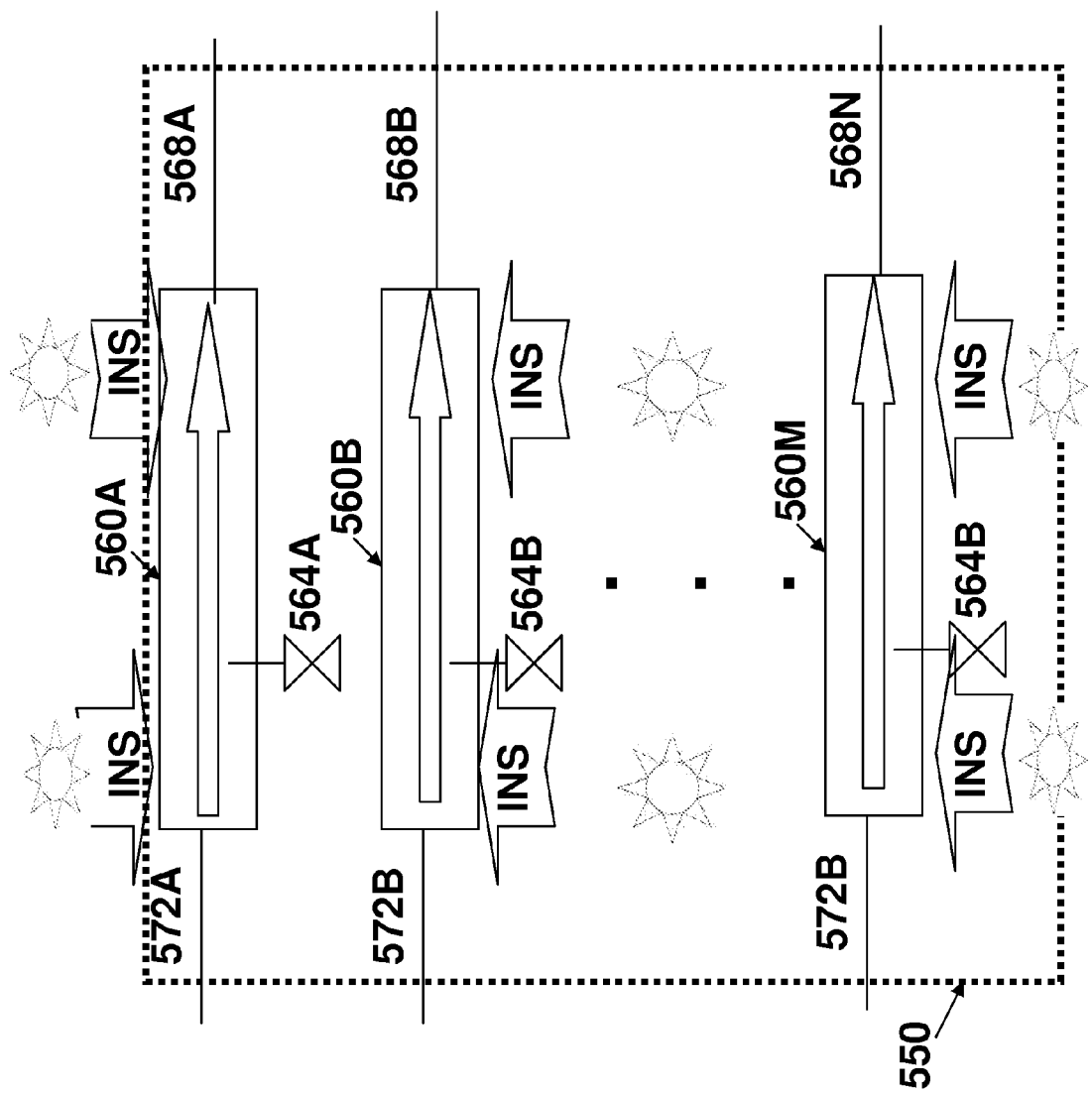

A Discussion of FIGS. 14A-14B

As is evident from FIG. 14A, a solar boiler 500 (i.e. any solar receiver including but not limited to a solar evaporator 810, a solar supercritical steam generator 810, a solar superheater 820 and a solar re-heater) may include a plurality of panels 550 with receiving surfaces (commonly panels of tubing to withstand high pressures) linked in series with each other. As the steam or water flows as illustrated by the block arrows from inlet 504 to outlet 508 towards the turbine 580, the steam or water is heated by insolation so that the temperature upon exiting each panel exceeds the temperature upon entering the panel, i.e., TBC>TAB>TIN, etc. Each panel 550 in FIG. 14A also may include one or more drains 522 for releasing steam and/or water.

FIG. 14B shows the structure of the plurality of parallel tubes 560 embedded within a single solar heating panel 550. Once again, the water or steam flows in the defined direction so that the outlet temperature exceeds inlet direction (due to insolation). As is illustrated in FIG. 2B, a solar panel includes a plurality of tubes 560 (for example, 10-200 tubes where each tube has a diameter of between about 2 cm and 10 cm).

In some embodiments, one or more of the teachings described herein is useful for at least one of: increasing solar energy generation efficiency during days of intermittent cloudy periods, maximizing electricity production and/or revenue generation of a solar electric facility, and meeting reliability requirements of an electric transmission network operator.

Features of the disclosed embodiments can be combined, rearranged, omitted, etc., within the scope of the invention to produce additional embodiments. Furthermore, certain features may sometimes be used to advantage without a corresponding use of other features.

It is, thus, apparent that there is provided, in accordance with the present disclosure, solar power generation systems, methods and devices with multiple energy conversion modes. Many alternatives, modifications, and variations are enabled by the present disclosure. While specific embodiments have been shown and described in detail to illustrate principles of the invention, it will be understood that the invention may be embodied otherwise without departing from such principles. Accordingly, Applicants intend to embrace all such alternatives, modifications, equivalents, and variations that are within the spirit and scope of the present invention.

What is claimed is:

1. A solar steam system comprising:
    an upstream solar receiver configured to subject pressurized water flowing therein to an insolation-driven phase change to produce pressurized steam;
    a downstream solar receiver in fluid communication with the upstream solar receiver and configured to use insolation directed thereon to superheat the pressurized steam from the upstream solar receiver;
    a steam turbine coupled to receive a flow of steam exiting from the downstream solar receiver and configured to be driven by superheated steam;

a plurality of heliostats configured to re-direct insolation onto the upstream solar receiver or the downstream solar receiver; and a control apparatus for regulating at least one of flow and insolation properties of the solar steam system, the control apparatus being configured to respond to a diminishing insolation event by re-aiming at least some of the plurality of heliostats to effect a net migration of heliostats from aiming at the downstream solar receiver to aiming at the upstream solar receiver so as to reduce an extent of superheating in the downstream solar receiver while the steam turbine continues to be driven by steam that is further heated after exiting the downstream solar receiver en route to the steam turbine.

2. The system of claim 1, further comprising:

one or more insulated conduits for conveying steam from the downstream receiver to the steam turbine, each conduit including a solid material, wherein, after said re-aiming of heliostats in response to the diminishing insolation event, steam exiting the downstream solar receiver is further heated by enthalpy contained in the solid material of each conduit en route to the steam turbine.

3. The system of claim 2, wherein the control apparatus is configured to block the steam flow into the steam turbine at a time after said re-aiming of heliostats so as to effect an orderly shutdown of the steam turbine.

4. The system of claim 3, wherein the control apparatus is configured to block the steam flow such that a time between said re-aiming of heliostats and a cessation of steam flow from the downstream receiver to the steam turbine is at least two minutes.

5. The system of claim 3, wherein the reduction in the extent of superheating in the downstream receiver causes a temperature drop of at least 20° C. for an inner wall of each conduit from a time of said re-aiming of heliostats to a time of a cessation of steam flow from the downstream receiver to the steam turbine.

6. The system of claim 5, wherein the temperature drop is at least 50° C.

7. The system of claim 3, wherein for a majority of a time between said re-aiming of heliostats and the orderly shutdown of the steam turbine, the steam turbine operates at more than 10% of nominal rated capacity.

8. A solar steam system comprising:

a first solar receiver configured to use insolation directed thereon to superheat steam;

heliostats arranged to reflect insolation onto the first solar receiver so as to superheat the steam therein;

a thermal mass thermally coupled to steam flowing from the outlet of the first solar receiver to an inlet of a steam turbine; and a controller programmed to re-aim at least one of the heliostats away from the first solar receiver and heat the steam from the first solar receiver with the thermal mass in response to a temperature of the steam at an outlet of the first solar receiver being less than a threshold temperature required for use by the steam turbine.

9. The solar steam system of claim 8, wherein the thermal mass is constructed and arranged so as to store heat from the steam flowing from the first solar receiver to the steam turbine when the temperature of the steam at the outlet exceeds the threshold temperature and to use the stored heat to heat the steam flowing from the first solar receiver to the steam turbine when the temperature of the steam at the outlet drops below the threshold temperature.

10. The solar steam system of claim 8, wherein the thermal mass includes at least a portion of a fluid conduit between the first solar receiver and the steam turbine.

11. The solar steam system of claim 8, further comprising:

a second solar receiver arranged upstream of said first solar receiver, wherein the controller is configured to re-aim said at least one of the heliostats at the second solar receiver.

12. A method for providing solar heated steam to a steam turbine, comprising:

at a first time, aiming heliostats in a solar field so as to direct insolation onto a superheating receiver;

at the first time, flowing superheated steam exiting the superheating receiver into contact with a thermal mass and then to the steam turbine;

at a second time when a temperature of the steam exiting the superheating receiver for the steam turbine drops below or is predicted to drop below an operating threshold temperature, re-aiming at least some of the heliostats away from the superheating receiver; and at the second time, passing the steam exiting the superheating receiver into thermal contact with the thermal mass and then to the steam turbine such that the thermal mass heats the exiting steam to a temperature above the operating threshold temperature prior to entering the steam turbine.

13. The method of claim 12, wherein said flowing steam to the steam turbine at the first time includes passing the steam exiting the superheating receiver into thermal contact with the thermal mass, the exiting steam having a temperature above said operating threshold temperature such that the thermal mass is heated to a temperature above the operating threshold temperature.

14. The method of claim 12, wherein the thermal mass includes at least a portion of a fluid conduit between the superheating receiver and the steam turbine.

15. The method of claim 12, wherein said re-aiming includes reducing solar energy incident on the superheating receiver in favor of increasing solar energy incident on another receiver supplying the superheating receiver with steam.

16. The method of claim 12, wherein the re-aiming includes re-aiming at least one heliostat away from the superheating receiver to another receiver, which supplies the superheating receiver with steam.

17. The system of claim 1, wherein the control apparatus is configured to re-aim to effect the net migration when a temperature of the steam exiting the downstream solar receiver drops below or is predicted to drop below a predetermined threshold temperature.

18. The system of claim 17, wherein said predetermined threshold temperature is an operating threshold temperature for the steam turbine.

19. A method for providing solar heated steam to a steam turbine, comprising:

at a first time, aiming heliostats in a solar field so as to direct insolation onto a superheating receiver, and flowing superheated steam exiting the superheating receiver into contact with a thermal mass and then to the steam turbine, a temperature of the steam exiting the superheating receiver being greater than a predetermined threshold temperature; and after the first time, re-aiming at least some of the heliostats away from the superheating receiver, and passing the steam exiting the superheating receiver into thermal contact with the thermal mass and then to the steam turbine, the temperature of the steam exiting the superheating receiver being less than the predetermined threshold temperature, wherein the thermal mass heats the exiting steam to greater than the predetermined threshold temperature prior to entering the steam turbine.

20. The method of claim 19, wherein said predetermined threshold temperature is an operating threshold temperature for the steam turbine.

* * * * *